United States Patent [19]
Chiu et al.

[11] Patent Number: 5,914,718
[45] Date of Patent: Jun. 22, 1999

[54] METHOD AND APPARATUS FOR ORGANIZING A WORK SPACE FOR A COMPUTER CONTROLLED DISPLAY SYSTEM USING BORDERS AND REGIONS

[75] Inventors: Patrick Chiu, Menlo Park; Thomas P. Moran, Palo Alto; William J. van Melle, Los Alto, all of Calif.

[73] Assignee: Xerox Corporation, Stamford, Conn.

[21] Appl. No.: 08/670,966

[22] Filed: Jun. 26, 1996

[51] Int. Cl.⁶ .................................................. G06T 11/00
[52] U.S. Cl. .............................................................. 345/358
[58] Field of Search ................................... 345/433, 435, 345/339, 340–346, 358

[56] References Cited

U.S. PATENT DOCUMENTS 5,487,143   1/1996   Southgate .

FOREIGN PATENT DOCUMENTS 0 255 259     3/1988   European Pat. Off. .
0 667 567 A2  8/1995   European Pat. Off. .

OTHER PUBLICATIONS

European Search Report and Annex for Application No. EP 97 30 4468 published Sep. 19, 1997.
"Cell–Width Determination In A Table", IBM Technical Disclosure Bulletin, vol. 27, No. 10B, Mar., 1985, p. 6014.

Primary Examiner—Almis R. Jankus
Attorney, Agent, or Firm—Richard B. Domingo

[57] ABSTRACT

A method and apparatus for organizing a workspace of a graphical input system that utilizes borders to define regions within the workspace. The present invention addresses the problem of determining the scope of structure operations. Structures, e.g. a list, table or other group of items having some fixed relationship by introducing the notion of a border dynamically created on such systems using available areas on the workspace. Some ambiguity may exist as to where a structure begins or ends. Further, such structure operations may cause a structure to overlay another structure. Borders are used to tessellate a work surface into non-overlapping regions. Typically, within each region is a structure. Deleting borders on a tessellated work surface may cause others borders to be deleted with the object being to maintain a completely tessellated work surface. Further, various border types, visually represented by different line types, are enabled which in turn provide for defining different types of regions.

20 Claims, 26 Drawing Sheets

METHOD AND APPARATUS FOR ORGANIZING A WORK SPACE FOR A COMPUTER CONTROLLED DISPLAY SYSTEM USING BORDERS AND REGIONS

CROSS REFERENCE TO RELATED APPLICATIONS

The present application is related to commonly assigned U.S. patent application Ser. No. not yet assigned entitled "Method and Apparatus For Organizing And Displaying Long Lists Of Data Items On A Work Space Of A Computer Controlled Display System" which was filed concurrently with the present application,

FIELD OF THE INVENTION

The present invention is related to the field of user interfaces for computer controlled display systems, and in particular to more efficiently organizing a work space of said user interface.

BACKGROUND OF THE INVENTION

Computer based systems such as pen based systems and "electronic whiteboards" (e.g. the LiveBoard™ available from LiveWorks a division of Xerox Corporation), provide graphical user interfaces based on utilization of an input device such as a pen, stylus or a cursor control device. In such systems the "display" shows a work space which acts as both a means for showing data and as an input medium. Graphic objects may be "drawn" on the display via pen strokes created using the input device. The graphic objects may represent words, figures or anything that can be displayed. Various operations can then be performed on the graphic objects using an input technique known as gestures. Gestures are themselves merely pen strokes which are interpreted as instructions. Sometimes, such systems will have a draw mode of operation and a gesture mode of operation to distinguish when a pen stroke creates a persistent graphic object or when the pen stroke is treated as a gesture.

To facilitate user interactions, the LiveBoard system provides the notion of structures. Various types of structures utilized by the LiveBoard system are described in EPA 0 667 567 A2, entitled "Apparatus and Method For Supporting the Implicit Structure of Freeform Lists, Outlines, Text, Tables, and Diagrams In A Gesture-Based Input System and Editing System", which is assigned to the same assignee of the present application. Conceptually a structure is a collection of graphic objects which have a particular relationship, e.g. a list of items written on the LiveBoard. When a structure operation occurs the relationship amongst the items is retained. For example, when an item is entered into the middle of a list, the items below the insertion point are moved down in order to make room for the inserted item.

As an electronic whiteboard is used, lists and other structures become clustered in distinct areas. This may be done consciously when the objects are created or by moving the graphic objects around with standard editing functions. Because of the close proximity in which objects and structures become positioned, problems can arise when the user wants an operation to affect only certain objects or structure.

A simple example is found in working with lists. To provide support for list operations such as reordering a list by moving an item to a different position in the list, the system must be able to compute the area containing the list. The list reordering operation will then only affect those objects in the area containing the list and leave objects in the other areas unchanged. However, when items and structures become closely clustered, it may be difficult to determine the area. Further, even if the area is correctly determined, performance of the operation may cause the list items to overwrite onto other objects.

One way to address this problem is to manually select the items, group them and move them to another location in the workspace. However, this is cumbersome and somewhat counterproductive.

Another technique for determining the area is described in the aforementioned EPA 0 667 567 A2, where a user drawn border line is used to limit the spatial extent of a selection operation. The border line is fixed at the place where it is drawn. So for example, if a border is put at the bottom of a list, selection of the list will terminate at the border. However, if items are added to the list, the border must be manually moved so that subsequent selections of the list will not be inhibited by the border. While useful for limiting the scope of selection operations, this could be burdensome when having to update lists.

Thus, it would be desirable to provide the user with a means to organize structures, graphical objects and space on the work surface in a simple and natural way that would also enable the system to easily determine the organization.

A related area to the present invention may include windowing systems, in particular windowing systems that provide for "tiled" windows. In a "tiled" windows system each window is always visible. This is contrasted with "overlap" window systems wherein windows may overlay one another. Microsoft Windows is an example of an overlay windows system. The Globalview system, designed for use on workstations available from the Xerox Corporation of Stamford, Conn., is an example of a system which provided a mode for a tiled windows system.

SUMMARY

The present invention enables a user to tessellate the work surface of a graphical display system into rectangular regions. The work surface is tessellated using structured borders. A structured border is dynamically created by a user during the course of interaction with the electronic whiteboard. A structured border is used as a delimiter for defining a region. The regions delimited by the structured borders define a scope for structure operations. The effect of such structure operations is confined to the region.

Various structured border types are enabled which in turn provide for defining different types of regions. A region may be defined that is expandable in all or some directions. A region may be defined that is not expandable. Finally, a region may be defined as a "flow" region such that list items contained therein may flow between adjacent flow regions. A structured border is visually represented as a straight line. The various region types will have structured borders represented as different types of lines (e.g. standard line, thick line and a dashed line).

Various graphical operations may be performed on structured borders, e.g. stretching, shrinking or deleting borders. However, the system will always operate to maintain complete rectilinear tessellation of the work surface. Thus "dependent" borders may be deleted or stretched or shrunk in order to maintain the rectilinear tessellation.

BRIEF DESCRIPTION OF THE FIGURES

FIGS. 15–16 are an illustration of moving list items within a region as may be performed in the currently preferred embodiment of the present invention.

DETAILED DESCRIPTION OF THE PREFERRED EMBODIMENT

A system for organizing the work space in a graphics based computer system is disclosed. The currently preferred embodiment of the present invention is embodied in a technique for creating and managing a tessellated workspace using structured borders. A tessellated workspace is one that completely divides the workspace into non-overlapping regions wherein operations on graphic objects are localized to the region it is contained in. Such operation is particularly advantageous when working with and manipulating lists of written items on the workspace.

The present invention operates to maintain complete rectilinear tessellation. So when borders are deleted or modified, "dependent" borders are deleted or modified accordingly. A complete rectilinear tessellation is necessary in order to maintain orderly and intuitive results when performing structure operations. Further, structured borders need not be fixed. Borders may move responsive to a structure operation.

While the present invention is preferably implemented on a system for supporting collaborative activities, such as an electronic whiteboard, the present invention is also well suited for other types of systems such as pen based systems, laptops, palmtops, electronic desktops and the like. Any system utilizing a graphical user interface on a workspace may utilize the present invention.

The following terms are used in this description and have their indicated meanings:

Graphic Object: Any displayed object in 2D space.

Work Space: A scrollable 2D space on which graphic objects are written and which is displayed in total or part on a display.

Curve: A graphic object created as a result of a pen stroke by a user or generated by the system (e.g. borders or as the result of a gesture).

Pen Stroke: An action with a pen which becomes an ink stroke or a gesture.

Ink stroke: A curve made with a pen stroke that is persistent.

Gesture: A curve made with a pen stroke that is ephemeral and which is interpreted as an action.

Selection: A set of graphic objects tagged as being selected.

Rectilinear Tessellation: Division of the workspace into rectangular regions so that every point on the workspace lies in a region.

Structure: A structure refers to a set of graphic objects having a predetermined relationship. Operations performed on graphic objects in the structure will preserve said predetermined relationship. Structures as may be utilized in the present invention are described in co-pending patent application Ser. No. 08/176,150 entitled "Apparatus and Method For Supporting The Implicit Structure Of Freeform Lists, Outlines, Text, Tables, and Diagrams In a Gesture-Based Input System And Editing System", which is assigned to the same assignee as the present application.

Figure 1:
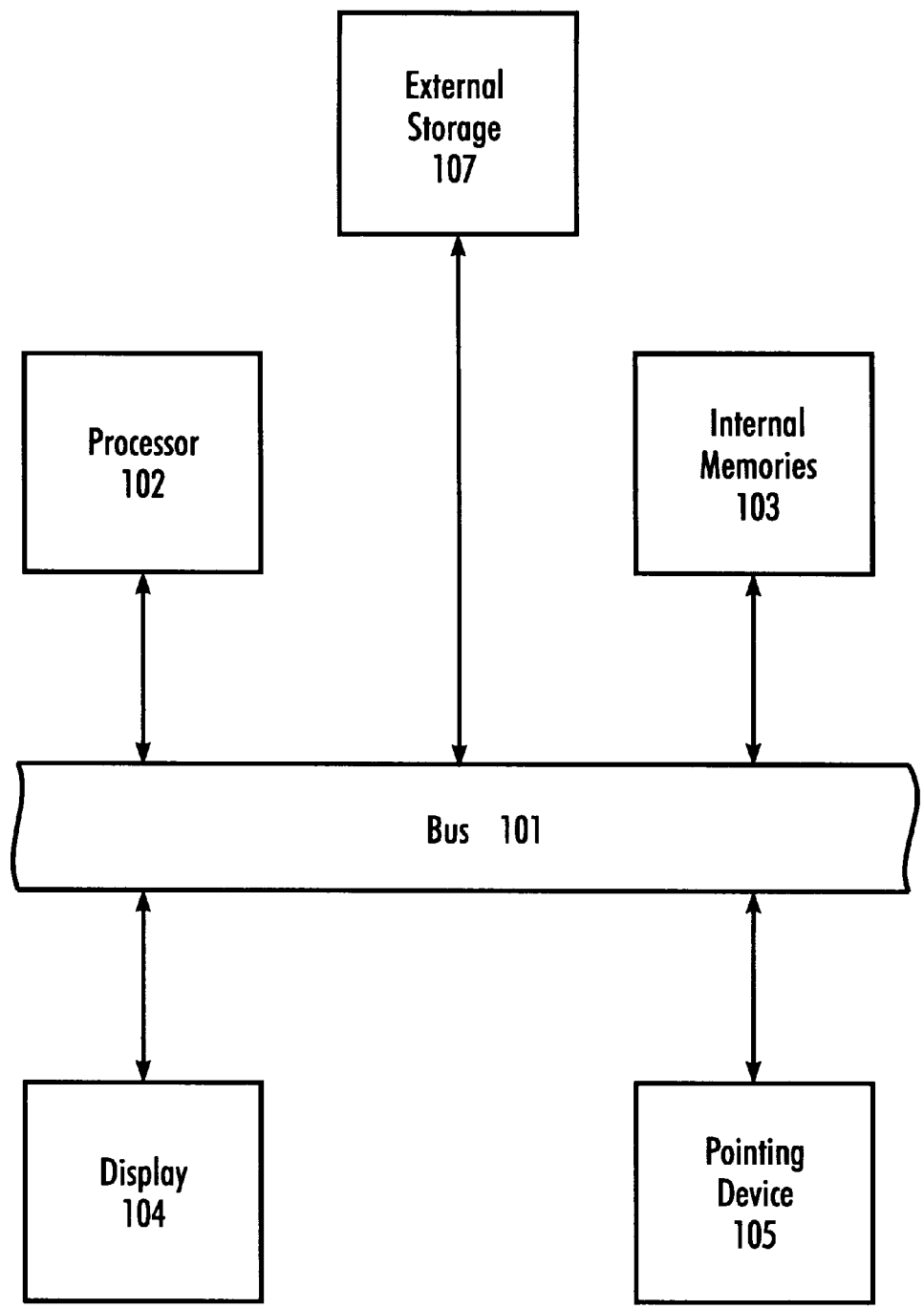
FIG. 1 is a block diagram of a graphics based computer system as may be utilized in the currently preferred embodiment of the present invention.

Overview of the Graphics Based Computer System of the Currently Preferred Embodiment The graphics based computer based system as may be utilized in the present invention is illustrated with reference to FIG. 1. Referring to FIG. 1, the computer based system is comprised of a plurality of components coupled via a bus 101. The bus 101 illustrated here is simplified in order not to obscure the present invention. The bus 101 may consist of a plurality of parallel buses (e.g. address, data and status buses) as well as a hierarchy of buses (e.g. a processor bus, a local bus and an I/O bus). In any event, the computer system is further comprised of a processor 102 for executing instructions provided via bus 101 from Internal memory 103 (note that the Internal memory 103 is typically a combination of Random Access or Read Only Memories). When in operation, program instructions for carrying out the various functional components of the present invention are stored in internal memory 103. The processor 102 and Internal memory 103 may be discrete components or a single integrated device. The processor 102 and internal memory 103 comprise circuitry for performing the various processing functions described herein. Also coupled to the bus 101 is external storage 107. The external storage 107 is typically a high capacity storage media such as magnetic or optical disk storage.

Also coupled to the bus 101 is a display 104 and pointing device 105. In the currently preferred embodiment, the pointing device 205 is a pen driven touch sensitive panel which is integrated with the display 104 as a touch screen display. Such touch screen displays are well known in the art and are utilized in such systems as Pen based system and for electronic whiteboard systems. However, the pointing device 105 and display 104 need not be integrated so that the pointing device 105 may also be a stylus, mouse, track-ball or other cursor control device.

Figure 2:
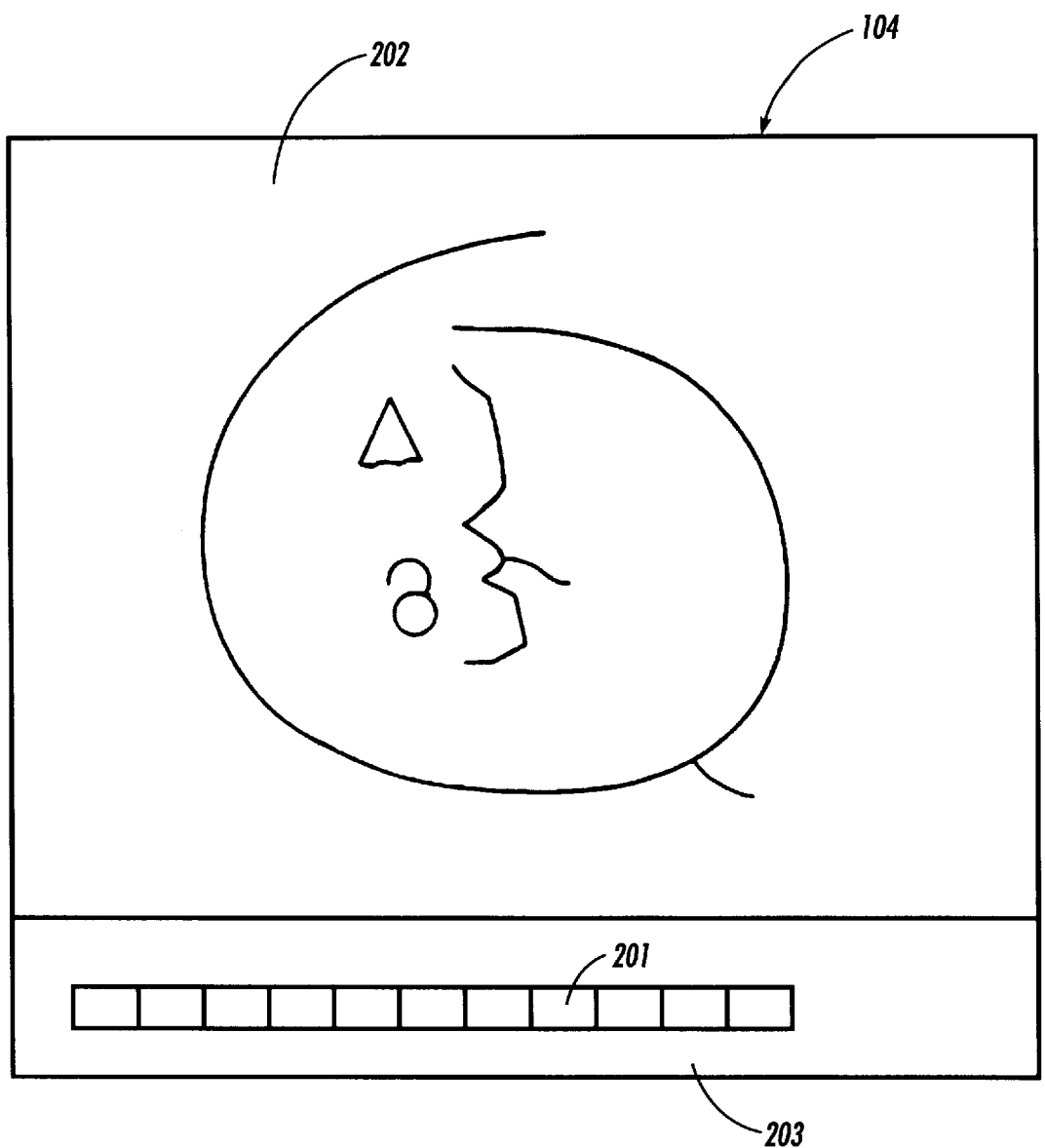
FIG. 2 is a representation of a basic graphical user interface and as may be displayed on the display and interfaced through the touch sensitive panel of FIG. 2.

FIG. 2 illustrates a particular implementation of a graphical user interface as may be used in the present invention. Referring to FIG. 2, the graphical user interface is displayed on display 104 and interacted with via touch panel 105. The graphical user interface employs a work surface 202 and may employ a plurality of accessible functions 201 as is shown. The work surface 202 is where a user may draw various curves and where other graphic objects are displayed. The accessible functions 201 are positioned at the button area 203 of the display. The functions 201 may include operations for editing graphic objects (create, delete, move, shrink, etc.) or changing the operating mode of the touch panel 103 (switching from draw and gesture mode).

These functions may alternatively be accessed by a pull down menus that are commonly found in Windows oriented applications. These functions however are optional in designation, their principal objects being to define operations which are inherent in the operation of the system. These functions may perform the same functions that are invoked by gestures.

Figure 3:
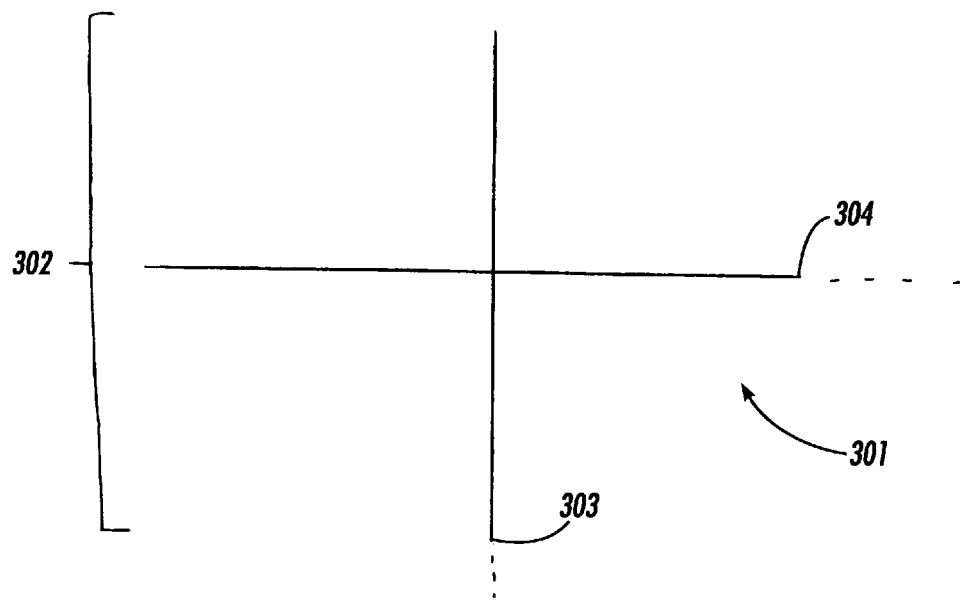
FIG. 3 is an illustration of an X-Y coordinate system illustrating the mapping of a work surface as may be utilized in the currently preferred embodiment of the present invention.

FIG. 3 illustrates conceptually the metes and bounds of a work surface in the currently preferred embodiment. It should be noted that a work surface utilizing the present invention need not be bounded and such an implementation would not depart from the spirit and scope of the present invention. Referring to FIG. 3, the work surface can be thought of as lying in the lower right quadrant 301 of an X-Y coordinate system 302. The work surface is bounded by the coordinate axes 303 and 304, such that the work surface is infinite in the right and down directions and bounded in the left and up directions. So, each of the coordinate axes 303 and 304 operates as a boundary.

The currently preferred embodiment of the present invention is implemented on a computer controlled display system having a Graphical User Interface (GUI). Such a GUI will typically support operations such as "point and click" and "drag and drop". A "point and click" operation is one where a cursor or a drawing device is positioned over a desired graphic object on the display. Once appropriately positioned, a button/switch associated with the cursor control device or drawing device is quickly depressed and released. This creates a signal which causes the graphic object to be selected. Other operations may require a "double click" where the button/switch is depressed and released rapidly, twice in succession. A "drag and drop" operation is one where the cursor or drawing device is positioned on a graphic object, the button associated with cursor control device or drawing device is held down, and the object moved or stretched until the button is released (or the movement exceeds some predetermined boundary).

The currently preferred embodiment of the present invention is implemented on a LiveBoard System operating under the control of a whiteboard emulation control program such as the Meeting Board™ application (both the LiveBoard and Meeting Board application are available from LiveWorks, a division of the Xerox Corporation. It should be noted that a version of the Meeting Board application is commercially available from LiveWorks under the name Meeting Desk, for operation on a personal computer class system.

General Operation of the Present Invention

Figure 4:
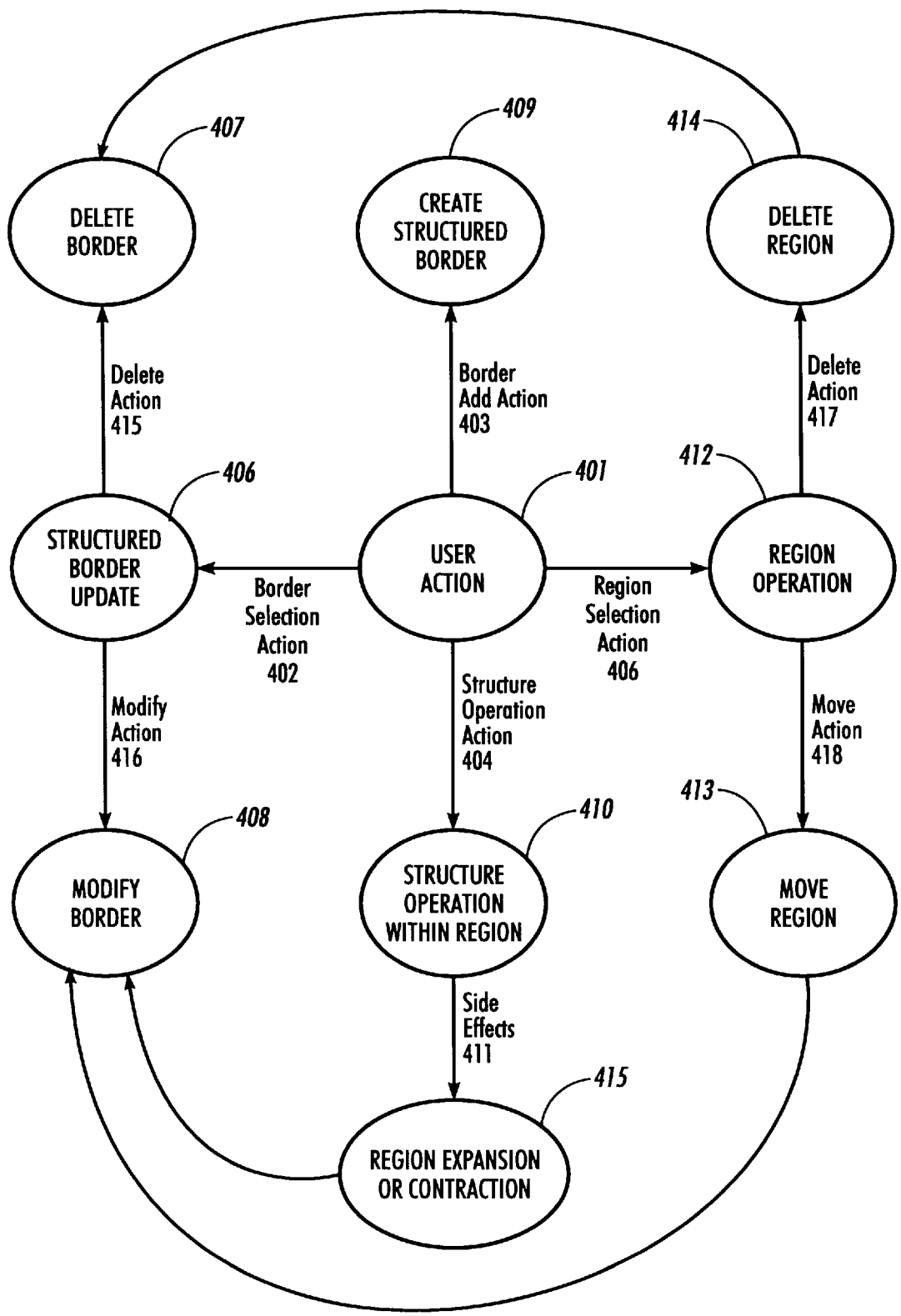
FIG. 4 is a state diagram illustrating the basic operation of the currently preferred embodiment of the present invention.

FIG. 4 is a state diagram illustrating in very high level terms, the general operation of a graphics based computer system operating the currently preferred embodiment of the present invention. The overall intent is to provide a work surface where the results of any editing operations on graphical objects in the tessellated workspace are performed in an intuitive and consistent manner. As will become apparent in the foregoing description, in the currently preferred embodiment such editing operations are structure operations. However, implementation of other types of editing operations on graphic objects that may take advantage of the tessellated work surface would not depart from the spirit and scope of the present invention. Referring to FIG. 4, the system is in a state 401 where it detects actions from the user. While in this state the user is performing editing operations in the work space such as adding, deleting or other wise manipulating graphic objects. Generally, from the user interaction state 401, four broad categories of gestures or action are relevant: a border selection action 402, a border creation action 403, a structure operation action 404, or a region selection action 405.

When a border selection action 402 is detected, a structured border update state 406 is entered. From the structured border state 406 a border may be deleted (delete border state 407) or modified (modify border state 408). Delete border state 407 is entered as a result of delete action 415 or as the result of the deletion of a region (described below). Modify border state 408 is entered as a result of a modify border action 416 or as the result of moving a region (described below). Modification of a border may include moving or stretching or contacting it. The effects of deletion and modification are described in greater detail below.

When a border add action 403 is detected, a create structured border state 409 is entered wherein a border is created and added to the work surface.

When a structure operation action 404 is detected, a structure operation within region state 410 is entered. Recall that a structure operation is an operation that affects a group of graphic objects having an inherent relationship. The structure operation is 1) an operation that would be "natural" for the structure, and 2) preserves the inherent relationship of the structure. For example, an operation may be to insert or remove an item into a list. As expected when the item is inserted, items below the place of insertion may "move down". During the course of the structure operation various side effects 411 may occur, e.g. moving items in a list, which may cause the region in which to expand or contract. Thus, a region expansion or contraction state 415 is entered. Such a region expansion or contraction my cause modification of a border. Thus, the modify border state 408 would be entered.

When a region selection action 405 is detected, a region operation state 412 is entered. From the region operation state 412 a region may be moved (move region state 413) or deleted (delete region state 414). The move region state 413 is entered when a move action 418 is encountered. When a region is moved or modified, this will typically require a border to move so the modify border state 408 is entered. When a region is deleted, this will typically require on or more borders to be deleted so the delete border state 407 is entered.

The effects that these operations have on the work surface and the graphic objects contained within the various regions will become apparent in the description below.

Structured Borders

A structured border is an ink stroke that is visually represented as a straight horizontal or vertical line segment that is bounded on one end and either bounded or unbounded on the other end. Recall that the work surface of the currently preferred embodiment is defined as the lower right quadrant of an x-y coordinate system. A horizontal boundary will always be at least bounded to the left by the y-axis and may be unbounded on it's right end if there is no intervening vertical boundary. Similarly, a vertical boundary will always be at least bounded at the top by the x-axis and may be unbounded to the bottom if there is no intervening horizontal boundary.

Figure 5:
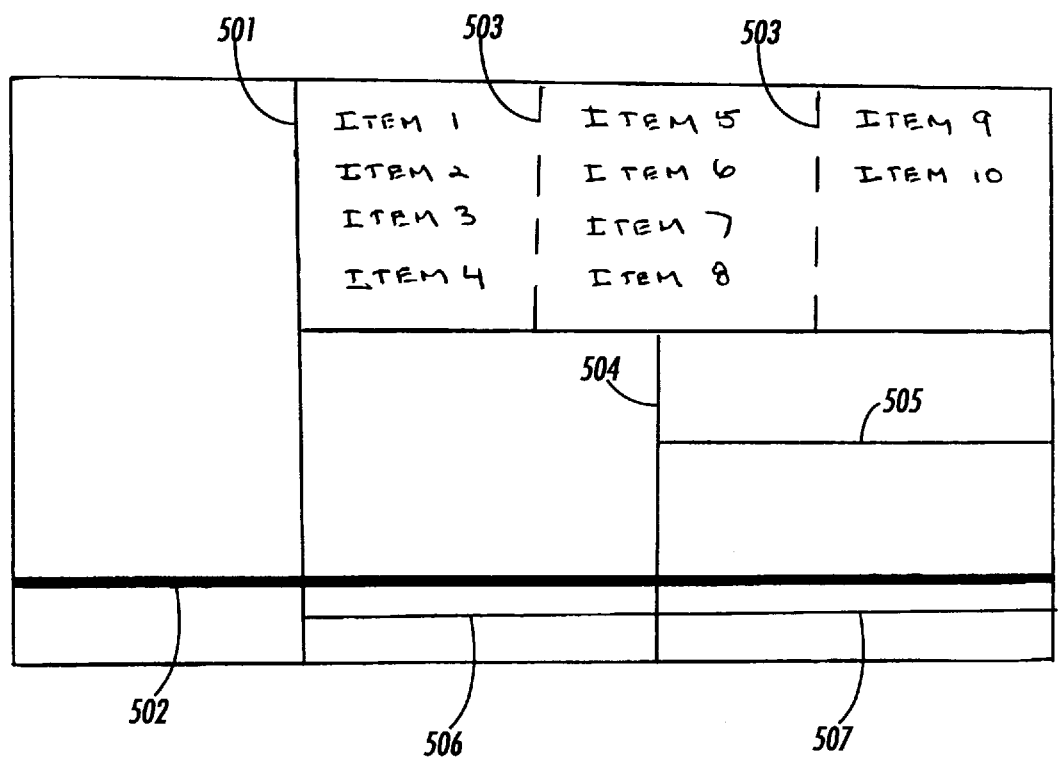
FIG. 5 is an illustration of structured borders tessellating a work surface.

FIG. 5 illustrates a work surface tessellated by a plurality of structured borders. Referring to FIG. 5, three types of structured borders are definable: standard, anchored, and flow-through. They are displayed as different types of lines. A standard border is illustrated as border 501. Standard borders are displayed with a "standard" width line. A straight line gesture as described above creates a standard border. Standard borders may be selected and moved, or may be moved automatically as a side effect of certain operations (e.g. the automatic region expansion described below).

An anchor border is illustrated as border 502. Anchor borders are displayed as "thick" lines. Anchor borders do not move as the result of a structure operation (but may be selected and then moved by the user). Anchor borders represent an "absolute" obstacle to any automatic adjustment of the work surface's tessellation.

Flow borders are illustrated as border 503. Flow through borders are displayed as dashed lines. Dashed borders delimit columns in a flow region (described below).

Borders also have relationships amongst themselves. Such relationships are illustrated in FIG. 5. Referring to FIG. 5, border 504 has dependent border 505. Border 505 is dependent on border 504 because if border 504 were to be modified or deleted, border 505 would also have to be modified or deleted, to maintain a rectilinear tessellation. Modifying and deleting borders is described in greater detail below.

Border 506 has a linear relationship with border 507. They are referred to as being linear extensions of each other.

It is useful to be able to change structured borders types. In the currently preferred embodiment the existing line thickness and type controls are used to change border types.

However, it is useful that structured borders have different properties from ordinary lines (typically created in a systems draw mode of operation). For example, a structured border cannot be easily erased using an erasure tool (this is contrasted from deletion which can be performed). As described below, erasure of a structured border may have undesirable consequences such as erasure of dependent borders. Further, structured borders must be readily identifiable so that operations can be more quickly identified and performed. Thus, a structured border has an internal representation which contains information that indicates that it is in fact a border.

Creation of Structured Borders

A structured border is created in various ways. A first way is by making a freehand straight-line gesture. The newly created border is placed at the location of the gesture, with its end points extended until it connects to the nearest border (or the side of a workspace) on either side that are perpendicular to the gesture. In the case where there are no borders to connect to, the border is unbounded (for example a vertical border where no horizontal border has been defined). Creation through a gesture is illustrated in FIGS. 6–7.

Figure 6:
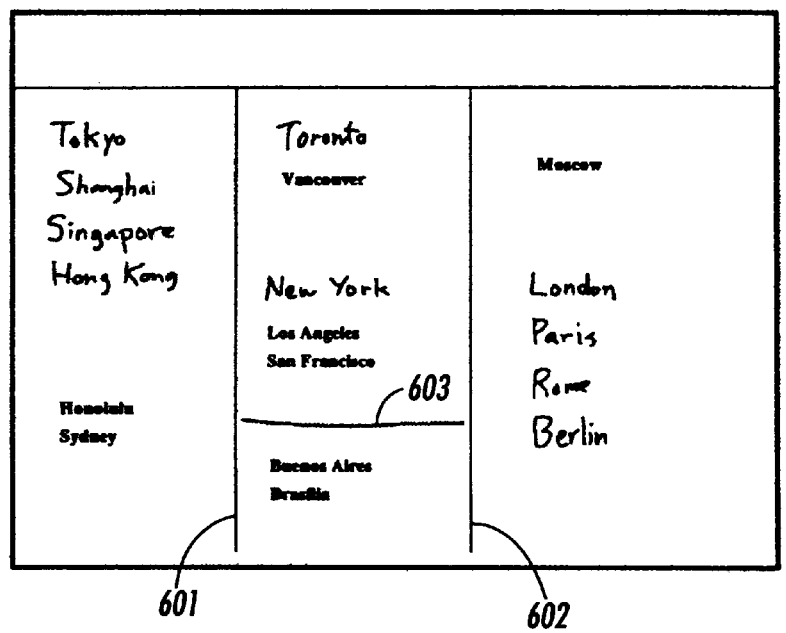
FIGS. 6 and 7 illustrate creation of a structured border using a gesture.
Figure 7:
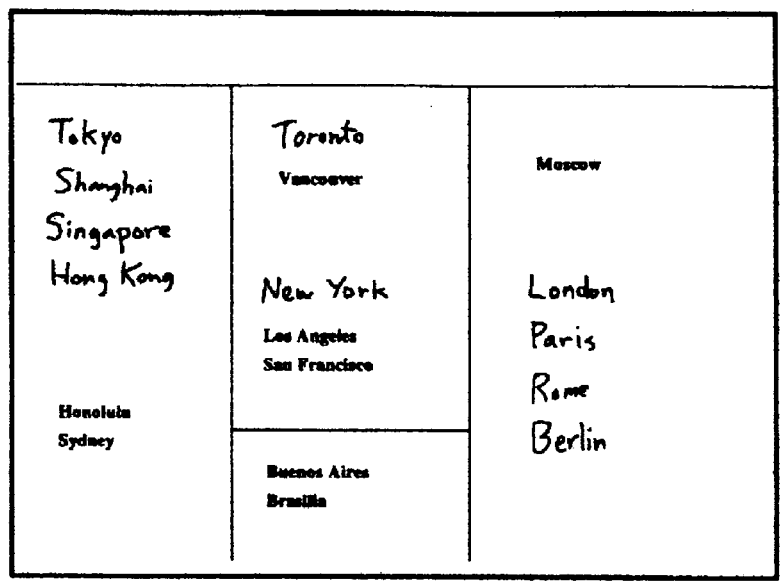

Referring to FIG. 6, the existing vertical borders 601 and 602 define columns and a gesture 603 has been made to create a horizontal border inside the second column of the work surface. FIG. 7 shows the resulting horizontal border 701.

In the above method there must be a clear horizontal space for the new border. Sometimes users want a border to divide objects where there isn't a clear horizontal or vertical space for a horizontal or vertical border. Thus, a second method for creating a border is to draw an arbitrary curve gesture from one border to another (or to the edge of the visible display). In this case the objects will be moved to create a clear horizontal or vertical space of the new border. The result is a straight border, with the objects automatically adjusted so that they belong in the regions indicated by the gestures. This is illustrated with reference to FIGS. 8–9.

Figure 8:
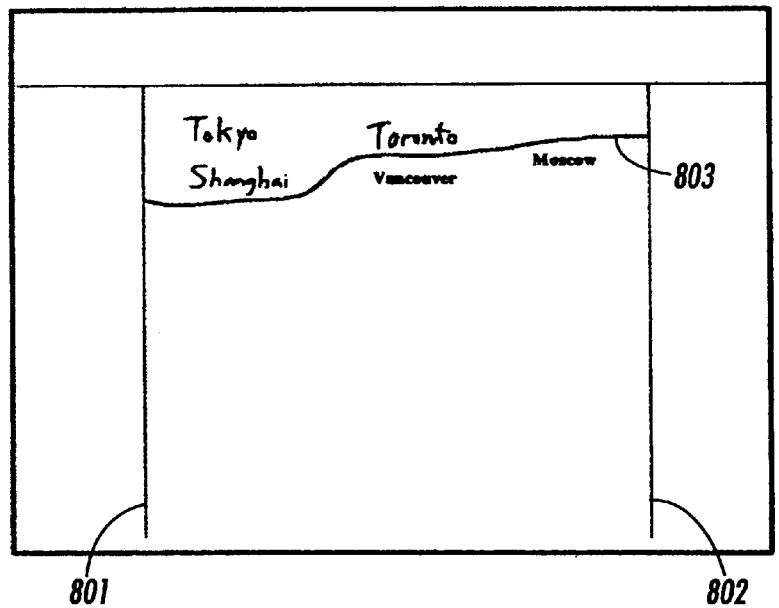
FIGS. 8 and 9 illustrate creation of a structured border which requires an adjustment to the spatial location of graphic objects on the work surface.

Referring to FIG. 8, a line 803 is drawn between vertical borders 801 and 802. The line 803 is not straight and divides the visible contents of the region into two distinct parts, one containing the marks Tokyo, Shanghai and Toronto, and the other Vancouver and Moscow.

Figure 9:
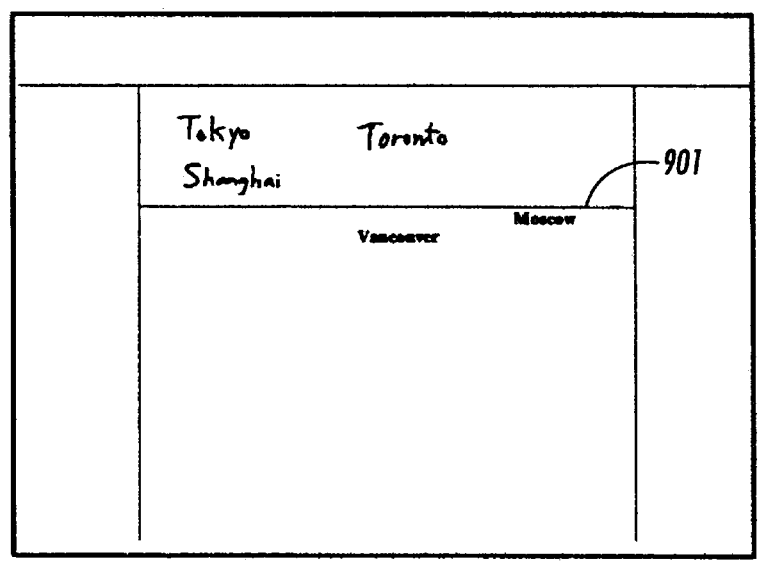

Referring to FIG. 9, the result of drawing the line connecting the two borders is illustrated. Here, the line 901 is straight and has "pushed" the marks Vancouver and Moscow below the line 901.

A third of way of creating a structured border is used to make flow regions, which in turn creates flow borders. This is described in greater detail below.

Manipulating Borders

Borders may be manipulated like any other graphical object. In order to be manipulated, a border must be "selected". In the currently preferred embodiment, any border may be selected by a tap gesture (or "tapping on it"). Selection of a border causes it to be "highlighted".

Figure 10:
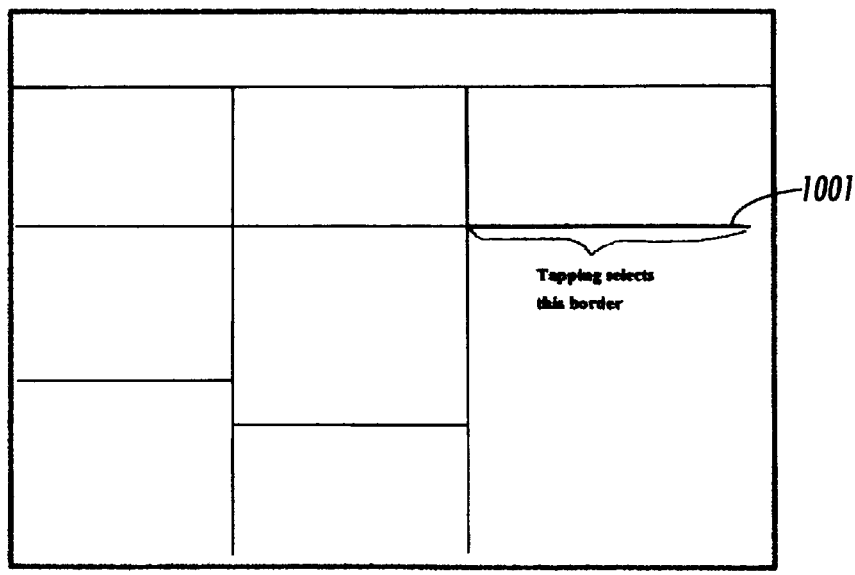
FIG. 10 is an illustration of selecting a structured border via a tap gesture as may be performed in the currently preferred embodiment of the present invention.
Figure 11:
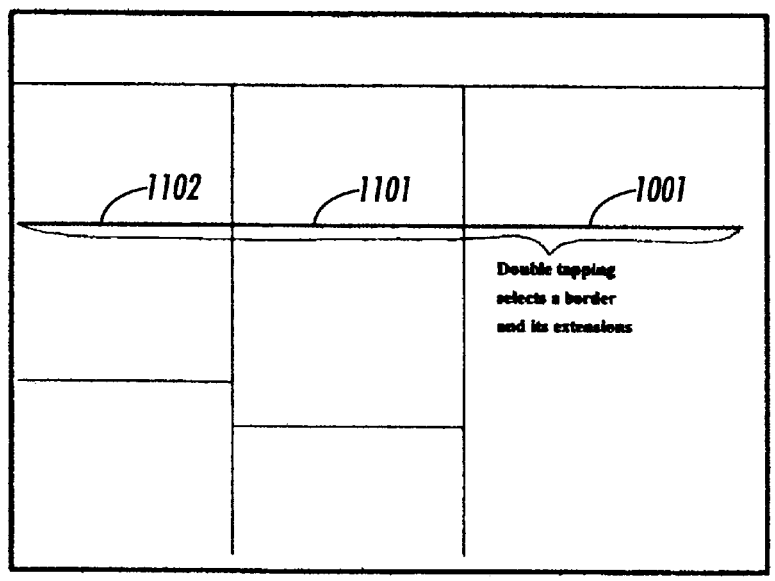
FIG. 11 is an illustration of selecting a structured border and its extensions via a double tap gesture as may be performed in the currently preferred embodiment of the present invention.

In the currently preferred embodiment, a structured border and its straight-line extensions may be selected by double tapping on it. This is illustrated in FIGS. 10–11. Referring to FIG. 10, a structured border 1001 has been selected via a single tap. Referring to FIG. 11, the structured border 1001 has been "double tapped" resulting in the border 1001 and its straight lines extensions 1101 and 1102 to also be selected.

To aid the user in lining up borders, when structured borders are created or moved, they "snap" to an invisible background grid with a small fixed grid size.

Figure 12:
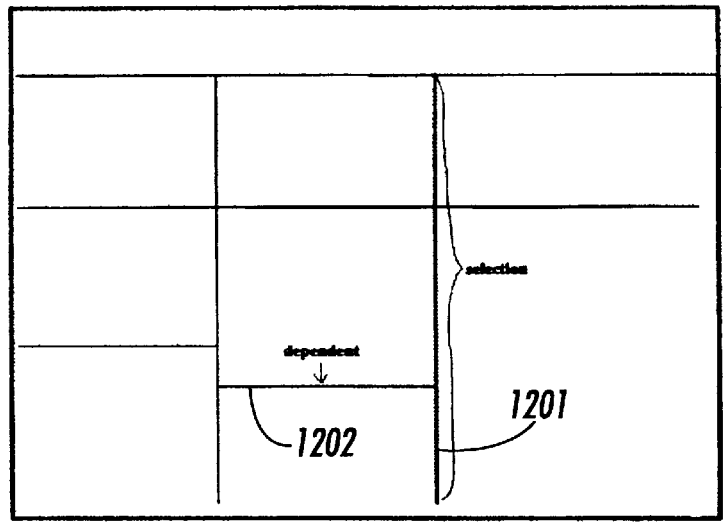
FIG. 12 is an illustration of selecting a structured border having dependent borders as may be performed in the currently preferred embodiment of the present invention.

Selecting a structured border also highlights those borders that are dependent on it. For a given border, its dependents are defined as those borders that need to be removed in order to preserve a rectilinear tessellation of the work surface if the "parent" border is removed. Dependent borders may also stretch or contract as the parent border is moved. Dependent borders of a selected border is illustrated in FIG. 12. Referring to FIG. 12, the border 1202 is dependent on border 1201. This is because if border 1201 is deleted, the border 1202 would violate the rectilinear tessellation of the work surface. As illustrated in FIG. 12, a dependent border situation will arise when two borders intersect to form a "T" shape. The dependent border will be the border which forms the cross-bar of the "T" shape.

Selected borders may be deleted (e.g. through the use of a deletion gesture such as a pigtail gesture). For structured borders, deletion will also delete its dependent borders.

Figure 13:
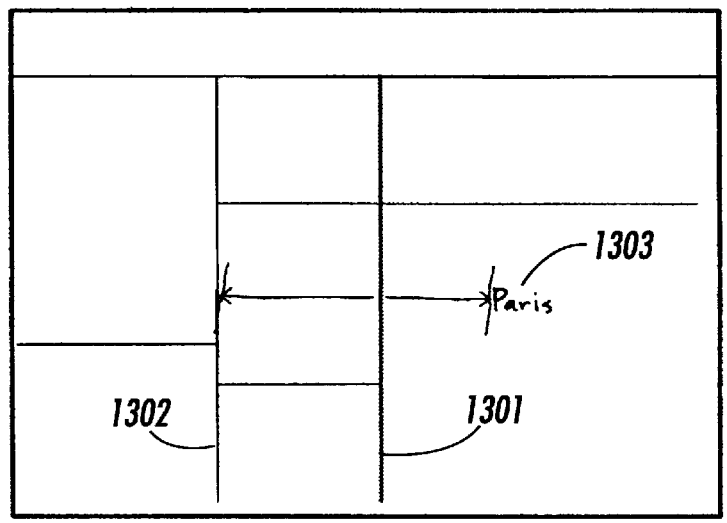
FIG. 13 is an illustration of limits of moving structured borders in the currently preferred embodiment of the present invention.
Figure 14:
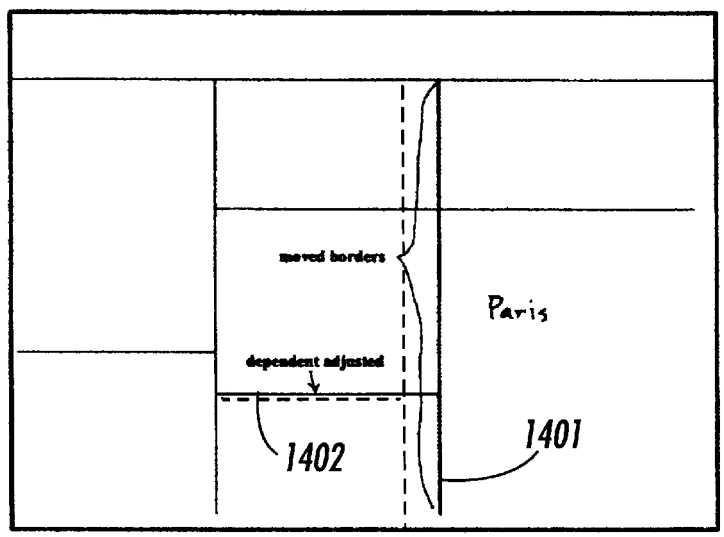
FIG. 14 is an illustration of moving a structured border and the resulting adjustments of dependent borders as may be performed in the currently preferred embodiment of the present invention.

Selected borders may be moved by a drag operation. For structured borders, the movement is obstructed by other borders and objects (as if they were physical objects stopping the movement). This is illustrated in FIG. 13. Referring to FIG. 13, the selected border 1301 is obstructed by border 1302 and by object 1303. Thus the range of movement for the selected border 1301 is between those two objects. Further, any dependent borders may extend or contract to preserve the rectilinear tessellation structure. This is illustrated in FIG. 14. Referring to FIG. 14, selected border 1401 has been moved to a new position, while dependent border 1402 has stretched in order to remain in contact with border 1401 in accordance with a rectilinear tessellation structure.

Regions

A region is an area in the workspace delimited by borders. When the borders are structured borders, the region is rectangular.

It should be noted that regions, and the boundaries associated therewith, are defined based on the graphical objects selected. This will become apparent below in the discussion regarding complex regions.

In the currently preferred embodiment, structured operations for grouping and manipulating list items are available.

Figures 15, 16:
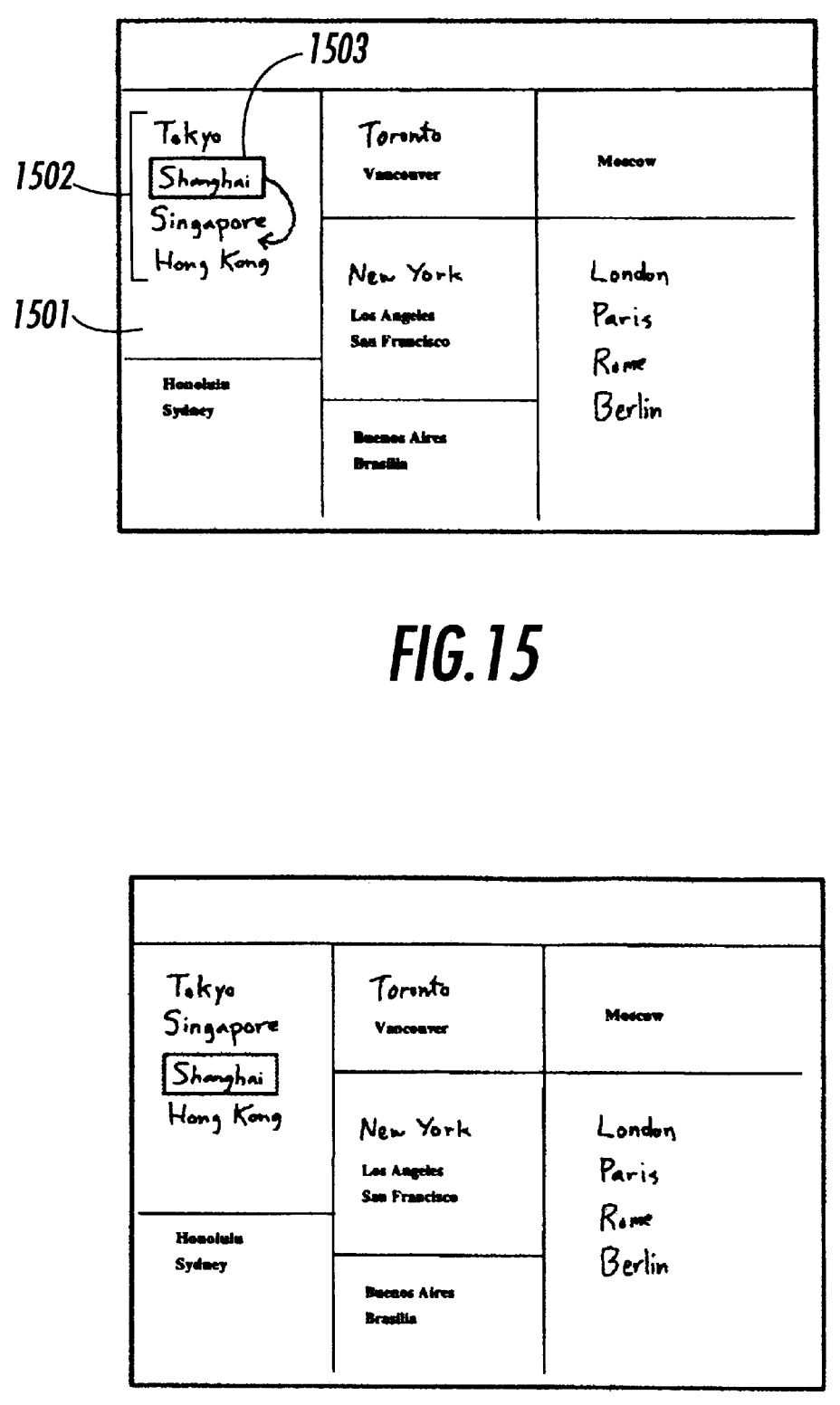

The present invention limits these operations to the interior of regions. In the most basic case, a list operation affects only objects within a single region without disrupting the layout of objects on the rest of the work surface. This is illustrated in FIGS. 15–16. Referring to FIG. 15, in region 1501 an item 1503 in list 1502 is to be re-positioned. This repositioning is illustrated in FIG. 16. Note that no objects outside of region 1501 were affected.

Figure 17:
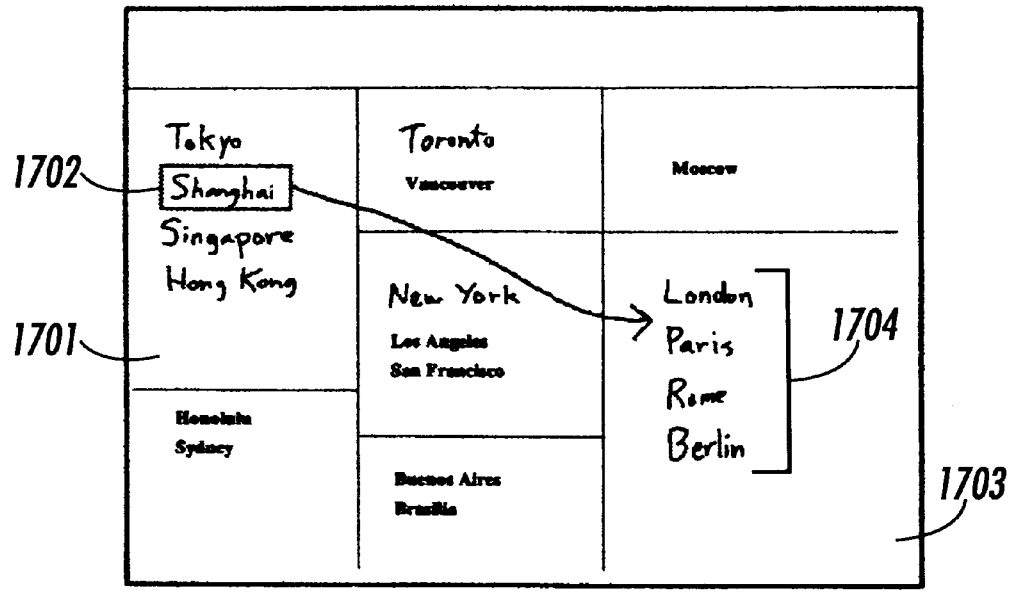
FIGS. 17–18 are an illustration of moving a list item from a first region to a second region as may be performed in the currently preferred embodiment of the present invention.
Figure 18:
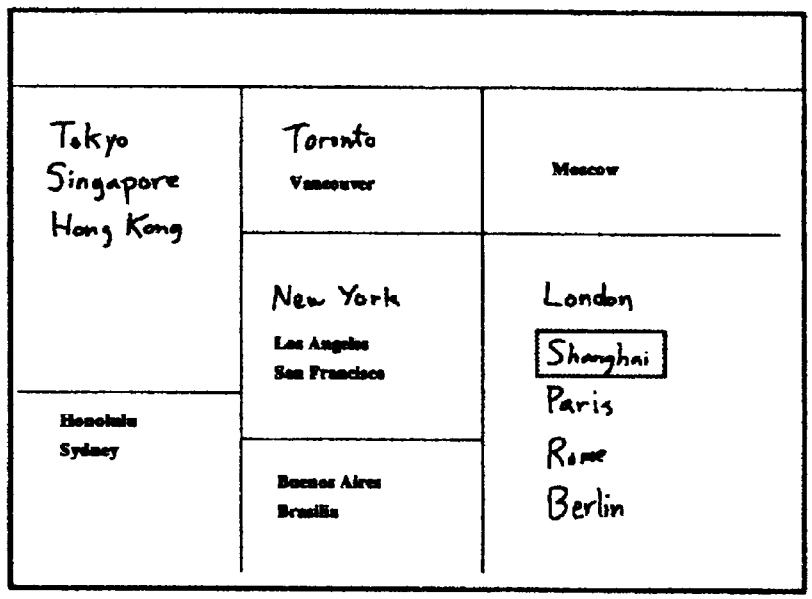

Another basic case is performing a list operation between two regions. This is illustrated in FIGS. 17–18. Referring to FIG. 17, an item 1702 from region 1701 is being moved to list 1704 in region 1703. The result is illustrated in FIG. 18. Note that no objects outside of regions 1701 and 1703 were affected.

In the currently preferred embodiment, regions are "implicit" objects in that they are computed on-the-fly for the duration of a specific operation. The location, size and scope for the relevant region are tacitly determined by the actions of the user. For example, the user makes a selection, and the system computes the region based on the location and size of the selection—it is the area bounded by the nearest four borders surrounding the selection.

Complex Regions

Figure 19:
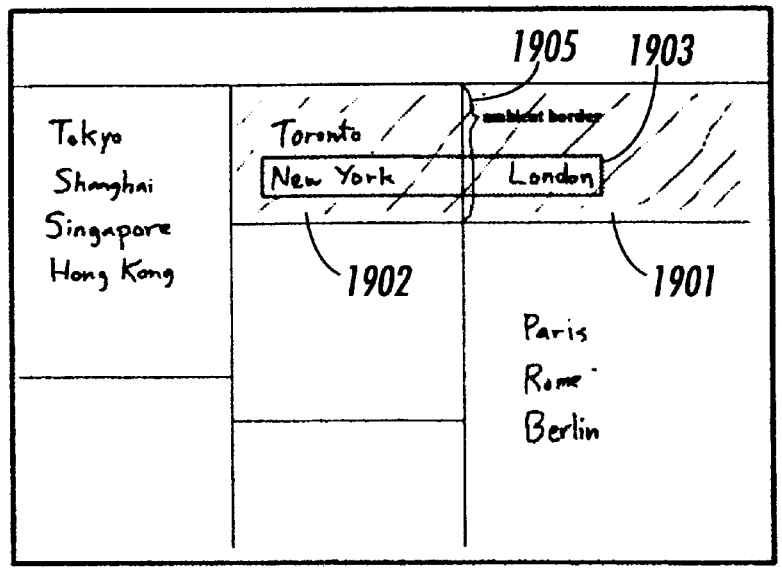
FIG. 19 is an illustration of a complex region, wherein a selection is made that spans across an "ambient" border as may be performed in the currently preferred embodiment of the present invention.

Complex regions are regions that contain borders or subregions. A region containing borders is shown in FIG. 19. Referring to FIG. 19, regions 1901 and 1902 are delimited by structured borders. Border 1905 delimits region 1901 from region 1902. The user may select a list item, e.g. list items or a whole row of list items across several regions, e.g. selection 1903. Here, the selection overlaps a border. In this case the borders overlapping the selection are momentarily considered to be "ambient", i.e. the border 1905, and the interpretation is that there is one region for the duration of the ensuing list operation.

Flow Regions

Figure 20:
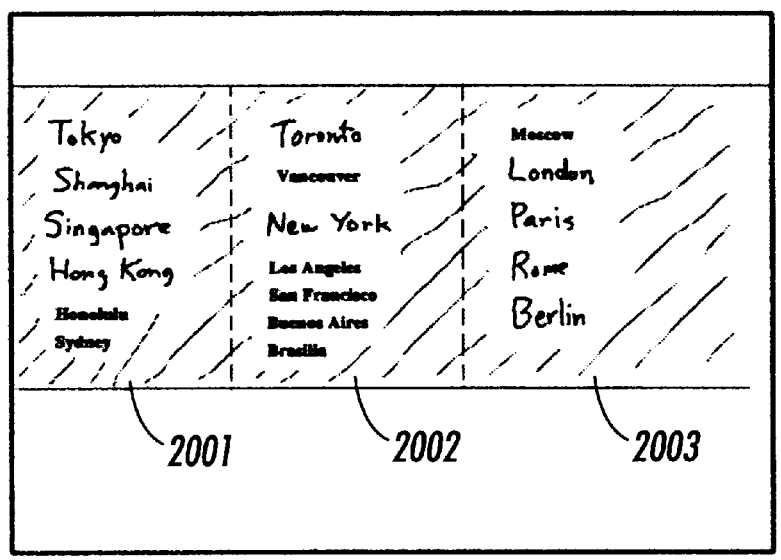
FIG. 20 is an illustration of a flow region in the currently preferred embodiment of the present invention.

A flow region is a sequence of columns in which a list is continued from one column into the next. The columns are divided by flow-through borders, which are shown as dashed borders. This is illustrated with reference to FIG. 20. Referring to FIG. 20, columns 2001–2003 comprise a flow region having a list of items. List operations of a flow region will cause the list to reformat, with items "flowing" (via animation) across the flow-through borders to fill a gap or make room for an insertion. List operations may occur within a single flow region, or between two flow regions. This is illustrated in FIGS. 21–22 and 23–24.

Figure 21:
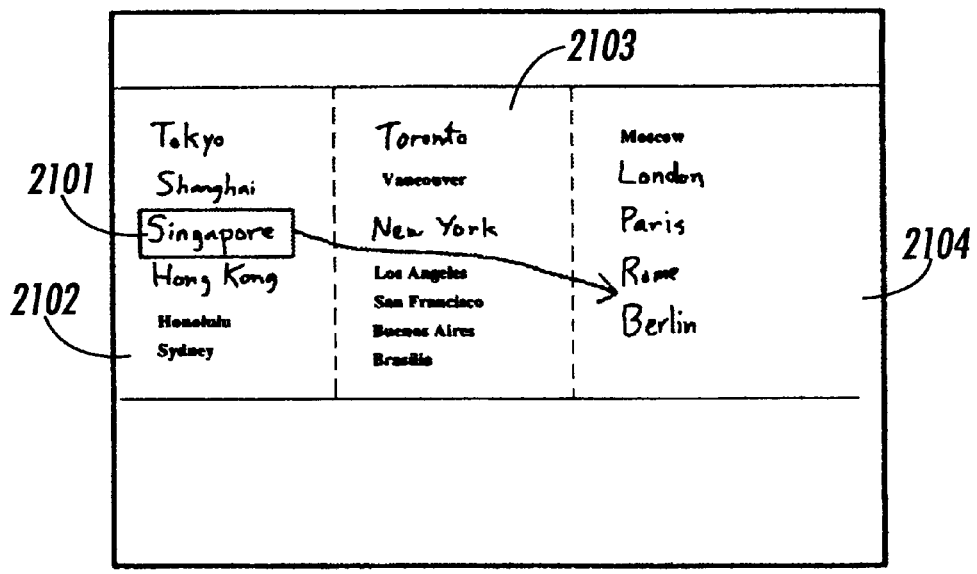
FIGS. 21–22 are an illustration of moving a list item within a single flow region as may be performed in the currently preferred embodiment of the present invention.
Figure 22:
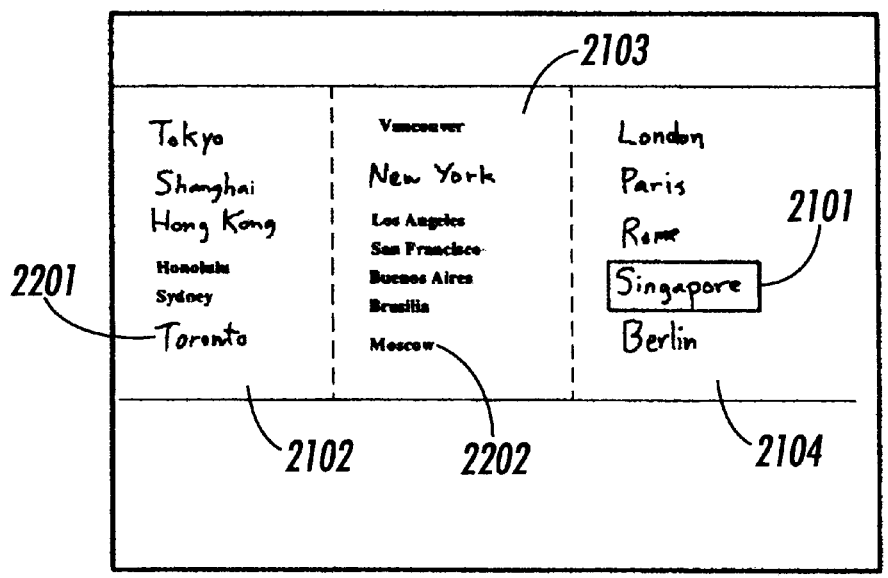

Referring to FIG. 21, a list item 2101 ("Singapore") is to be moved from a column 2102 to a column 2104. FIG. 22 illustrates the resulting "flow" after the movement of the list item 2101 ("Singapore"). It should be noted that items in the various columns are moved. Moving out of column 2102 is list item 2101 ("Singapore") and moving in from column 2103 is list item 2201 ("Toronto"). Moving out of column 2103 is list item 2201 ("Toronto") and moving in from column 2104 is list item 2202 ("Moscow")). Moving out of column 2104 is list item 2202 ("Moscow") and moving in is list item 2101 ("Singapore"). Other affected list items are shifted within the columns and are moved up or down accordingly.

Figure 23:
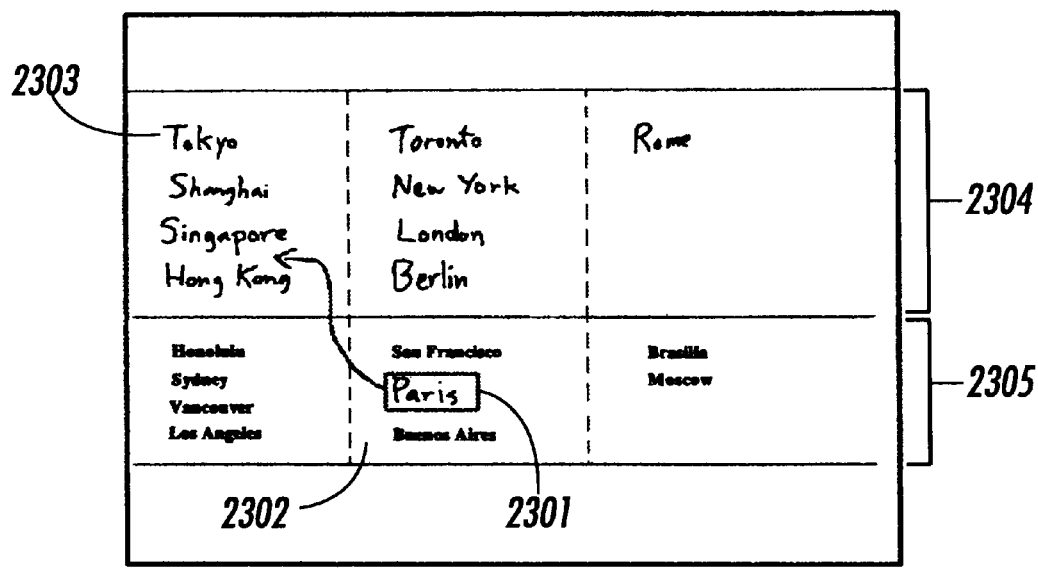
FIGS. 23–24 are an illustration of moving a list item from a first flow region to a second flow region as may be performed in the currently preferred embodiment of the present invention.
Figure 24:
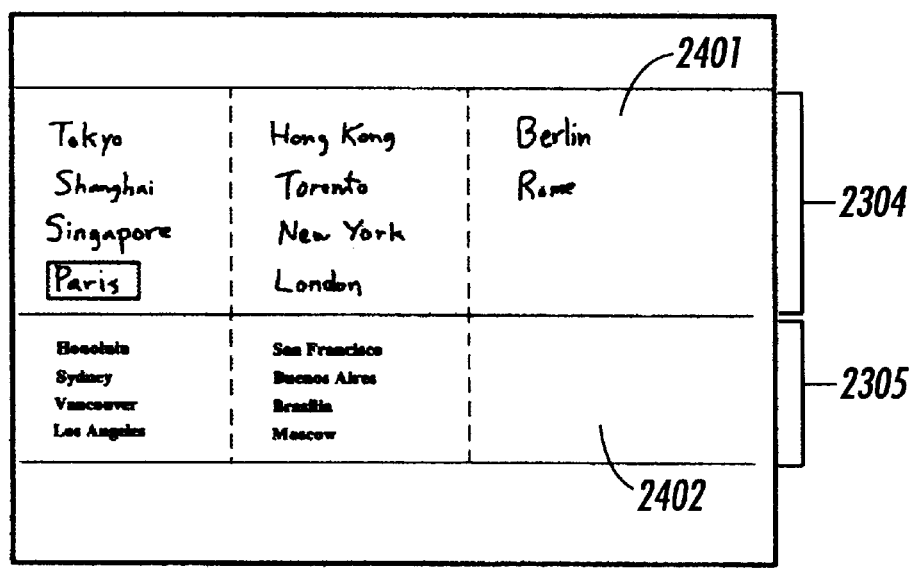

Referring to FIG. 23, list item 2301 ("Paris") is moved from a column 2302 of a first flow region 2305 to a column 2303 of a second flow region 2304. FIG. 24 illustrates the effects of the movement of list item 2301("Paris") on the various columns of flow regions 2304 and 2305. With respect to flow region 2304, the list of items has increased so that the resulting flow has caused an additional item to be placed in column 2401. With respect to flow region 2305, the list of items has decreased so that the resulting flow has caused all items in column 2402 to be removed. The affect on column 2402 further illustrates that the flow of items is based on item size, since in effect two items have replaced a single item of larger size.

Flow regions are particularly useful for working with long lists. They provide a way to deal with a long list that runs down a single page and cannot be fully viewed because the display window is too short. A common example of such a list is the result of a brainstorming session. In the currently preferred embodiment an operation is provided which reformats a long list by creating a flow region, scaling the list items, and placing them in the flow region so that all the items are visible on the display window.

Figure 25:
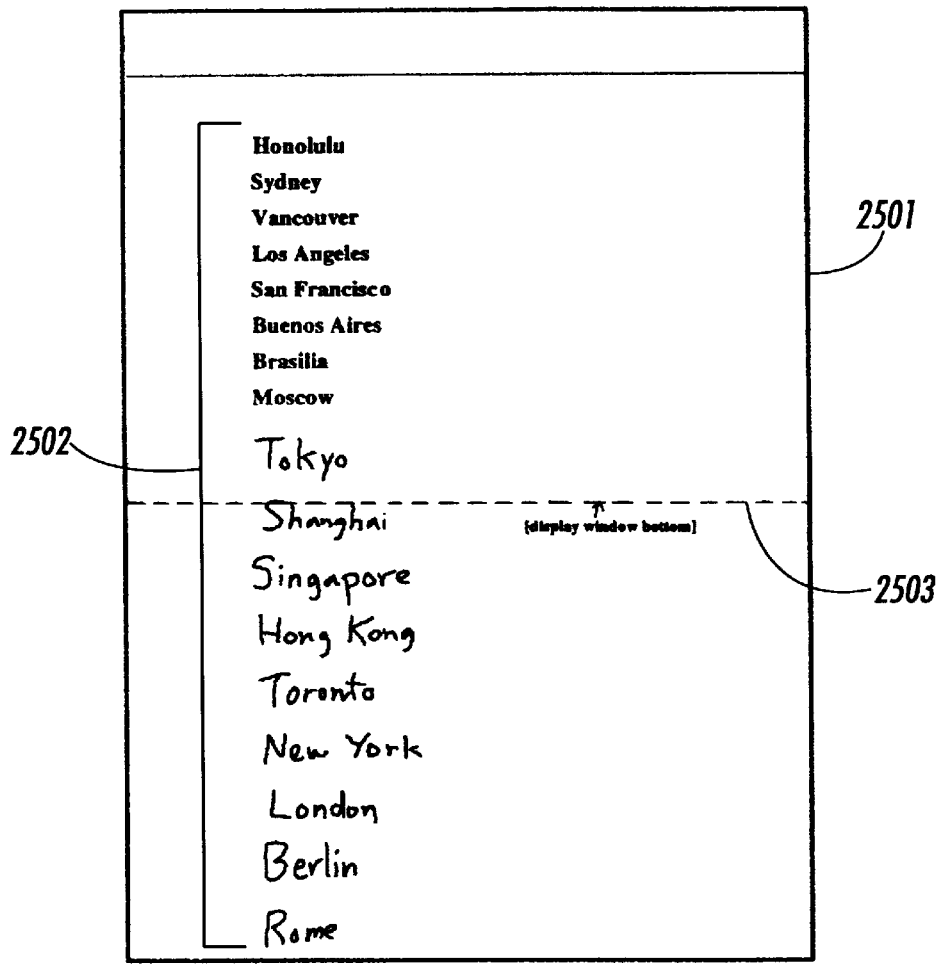
FIGS. 25–26 are an illustration of reformatting a long list into a flow region as may be performed in the currently preferred embodiment of the present invention.
Figure 26:
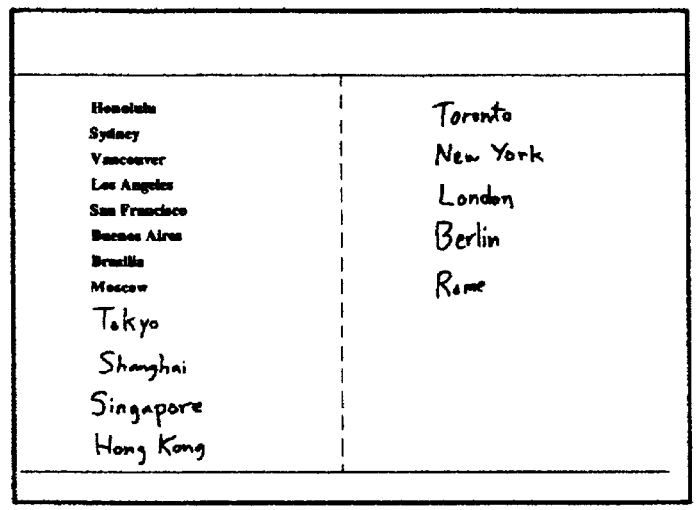

This is illustrated in FIGS. 25–26. Referring to FIG. 25, a work space 2501 has contained therein a list 2502. The list 2502 extends beyond the limits of the display (here illustrated as display limit 2503). Thus, the entire list cannot be viewed on the screen at one time. Referring now to FIG. 26, the list has been reformatted into a flow region which can be fully displayed on the display.

There is a basic operation called formatting a list. It involves taking a list and fitting it into a flow region of a given size. As many columns as needed will be created in the flow region; and the list items will be uniformly scaled to the size needed. The technique for formatting a list will choose the number of columns that maximized the scale of the items.

In the currently preferred embodiment, creation of flow regions is accomplished using one of the following techniques:

1. By changing existing borders to flow-through borders
a) User selects an existing border by tapping on it.
b) User edits the line characteristics to the dashed lines of a flow-through border.

Subsequent list operations will interpret the items as belonging to one list that flows across the flow-through borders.

2. By squeezing a region containing a list

Squeezing a region is a technique for reducing the size of the region and which can entail scaling of items in the region and reducing the amount of unused area in the region. When a region contains a list, it can be squeezed such that the region is converted to a flow region. The general notion of squeezing is described in greater detail below. In any event, to create a flow region the following steps are followed:

a) User selects the bottom border of a region containing a list.
b) User drags the selected border past the bottom of the lowest item in the list.
c) The system automatically creates new flow-through borders to provide additional columns to accommodate the list, and the list is reformatted into the new flow region.

Figure 27:
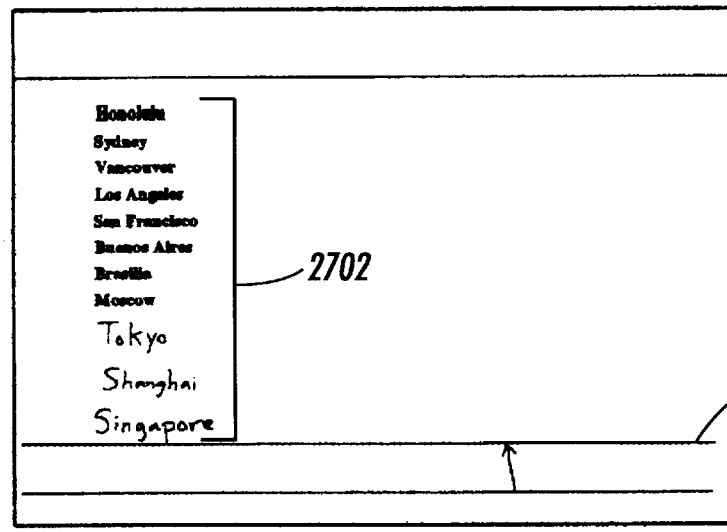
FIGS. 27–29 are an illustration of squeezing a region into a flow region as may be performed in the currently preferred embodiment of the present invention.
Figure 28:
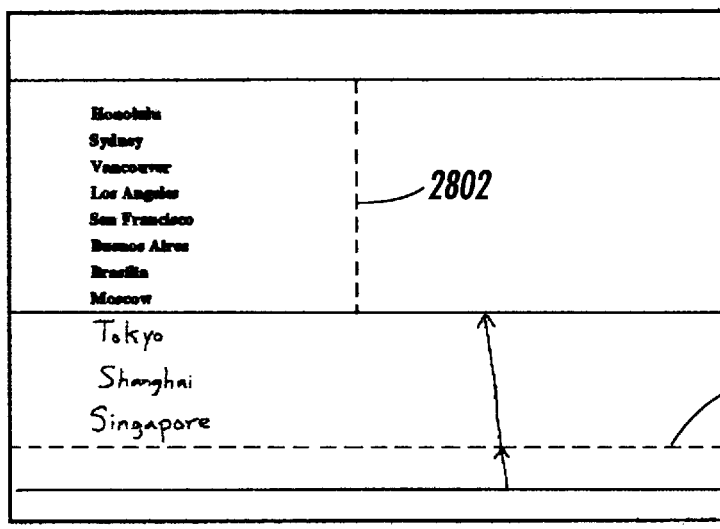
Figure 29:
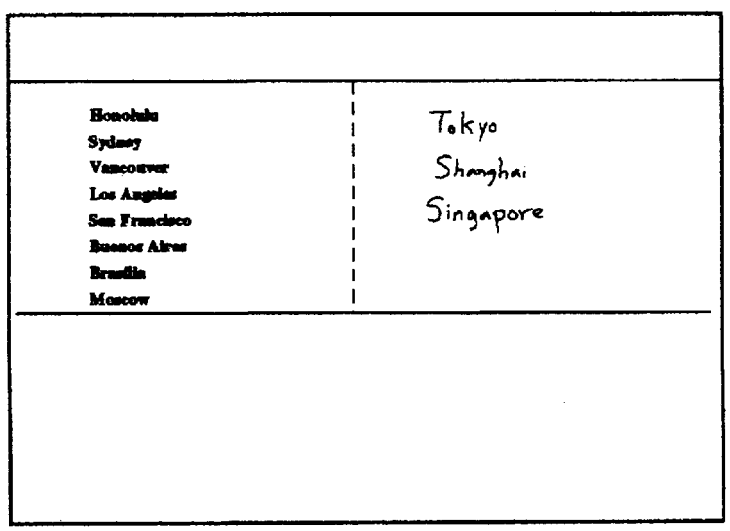

This is illustrated in FIGS. 27–29. Referring to FIG. 27, the user drags the bottom border 2701 of the region containing the list 2702. Referring to FIG. 28, when the user drags the selected flow border 2701 past a critical height, i.e. a height less that the total height of the list items 2801, highlighted flow border 2802 will appear as feedback to the user that flow borders are about to be created and the list items reformatted into the flow region. The resulting flow region is illustrated in FIG. 29.

In the currently preferred embodiment. because list items can be scaled there is no limit to how far the user can squeeze a region to create a flow region. However, there is a practical limit based on what the user can see. The currently preferred embodiment lets the user determine this practical limit.

It should also be noted that the currently preferred embodiment further supports an "unsqueeze" operation where the number of columns in a flow region is reduced by moving the bottom border down to create a larger flow region.

3. By "compress list to fit visible work surface" operation
a) User selects all the list items on a work surface without borders (e.g. the list is the result of a brainstorming session).
b) User invokes "compress list to fit visible work surface" via a menu, or by making a "double horizontal line" gesture across the selection (which is a mnemonic for splitting the list).
c) The system automatically creates a new border at the bottom of the visible work surface and a set of flow-through borders to provide columns to accommodate the list, and the list is reformatted, which may include scaling the list items, into the new flow region.

Figure 30:
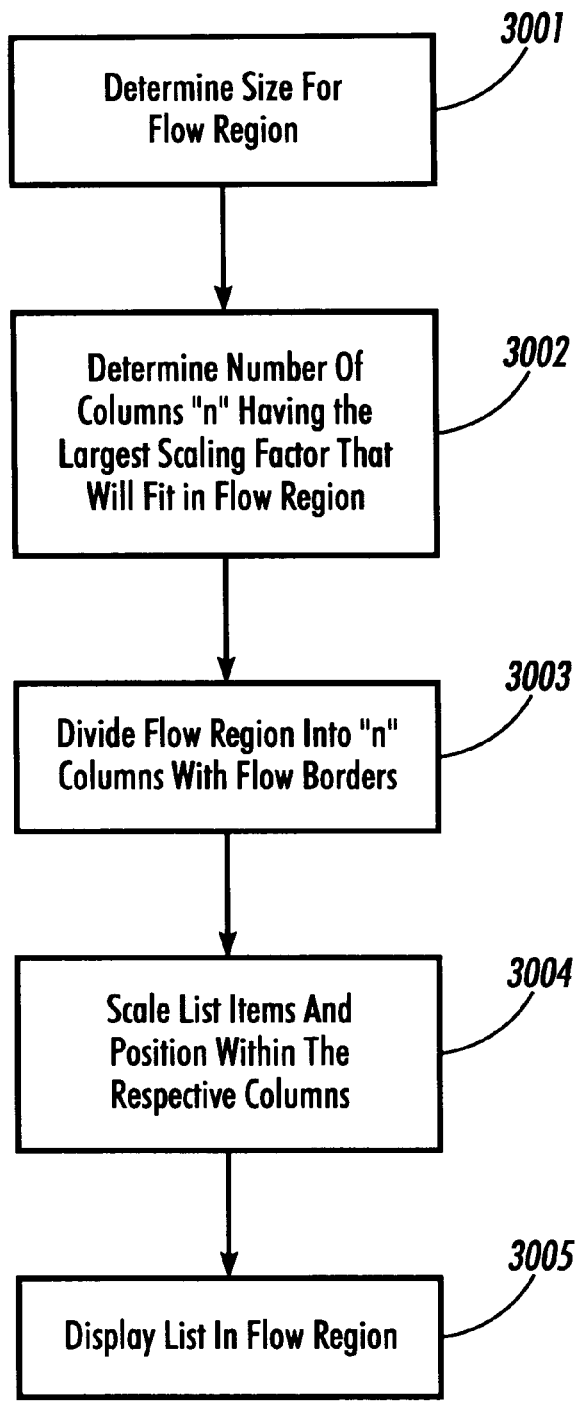
FIG. 30 is a flowchart describing the steps of formatting a list into a flow region as may be performed in the currently preferred embodiment of the present invention.

FIG. 30 is a flowchart describing the steps for formatting a list into a flow region. First, a size for the flow region is determined, step 3001, from the technique in which it was created (described above). Next, a columnar organization that will enable the list to fit into the flow region is determined. First, based on the size of the flow region and list items, determine a number of columns "n" having the largest scale factor that fits the list into n-columns inside the flow region, step 3002. Generally, the step 3002 may be performed by testing various numbers of columns and for each, determining a scale factor (i.e. how much the items must be shrunk) that will enable the entire list to fit into the flow region. The column number having largest scale factor will be selected.

Next, the flow region is divided into "n" equal columns with flow borders that are displayed inside the region, step 3003. Finally, the list items are scaled and positioned within the respective columns, step 3004. Finally, the flow region and list are displayed, step 3005. In the currently preferred embodiment, this positioning is from the left most column to the right most column. Thus the right most column may have a gap at the bottom. Of course, other mappings may be used, e.g. one where items are equally placed in the columns.

Manipulating Regions

Figure 31:
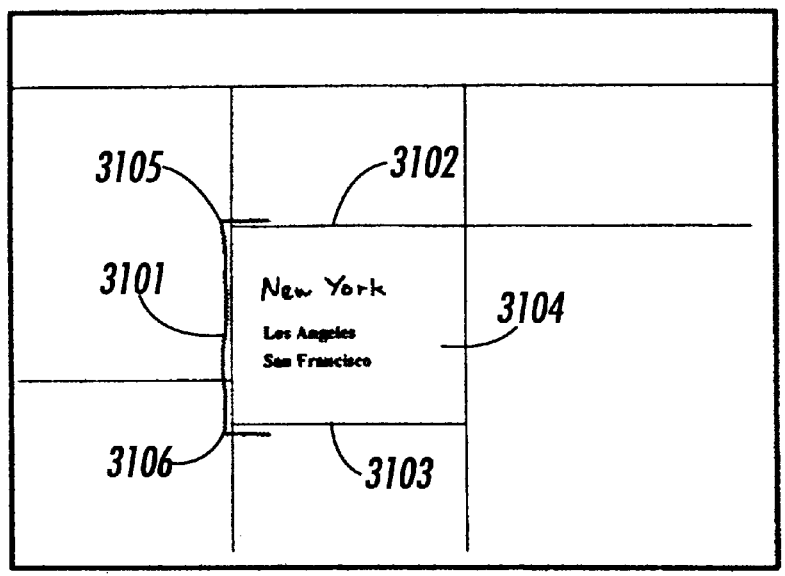
FIGS. 31–32 are an illustration of selecting a structured region with a bracket gesture as may be performed in the currently preferred embodiment of the present invention.
Figure 32:
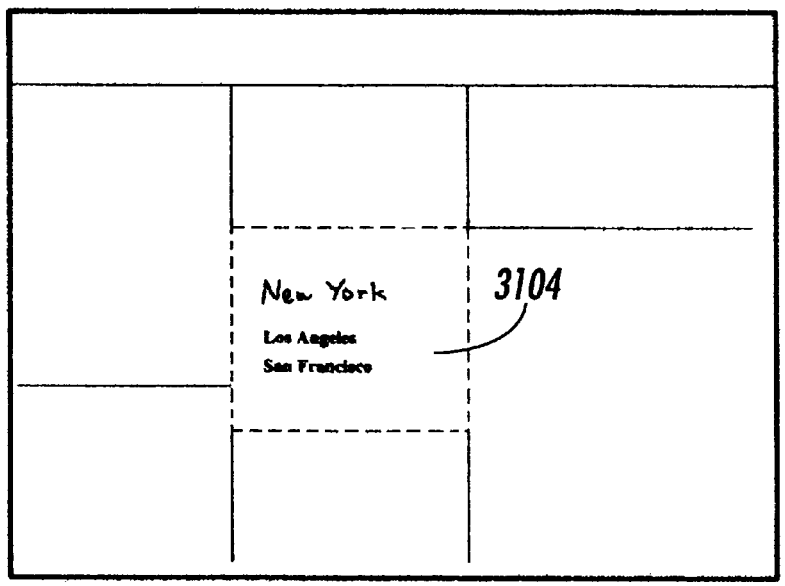

Like borders, regions may be selected and moved. Movement of a region also causes the graphic objects contained within the region to move. In the currently preferred embodiment selection of a region is performed by making square brackets ("[") or L-shape gestures, which indicate the regions selected. Selection using square brackets is illustrated in FIGS. 31–32. Referring to FIG. 31, square bracket gesture 3101 is invoked such that the corners 3105 and 3106 of the bracket gesture 3101 are aligned with the horizontal borders 3102 and 3103 of region 3104. The selection is illustrated in FIG. 32 as dashed lines around region 3104.

Figure 33:
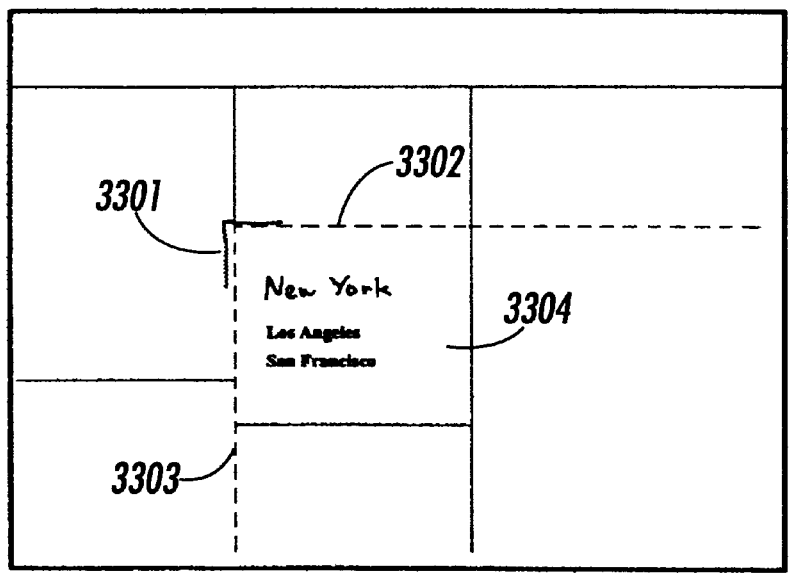
FIGS. 33–34 are an illustration of selecting a structured region with an L-bracket gesture as may be performed in the currently preferred embodiment of the present invention.
Figure 34:
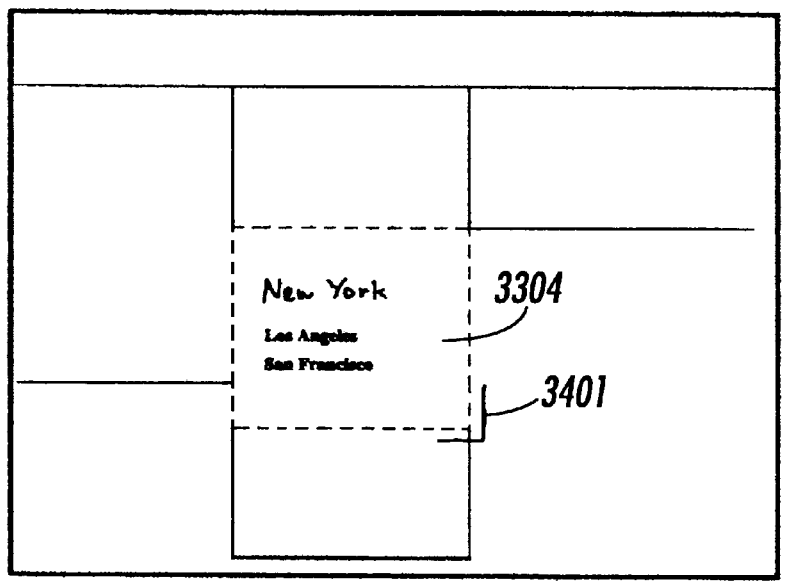

Selection using L-shape gestures are illustrated in FIGS. 33–34. Referring to FIG. 33, region 3304 is to be selected. A first L-shaped gesture 3301 causes borders 3302 and 3303 and their linear extensions to be selected. This clearly exceeds the bounds of region 3304. Referring now to FIG. 34, a second L-shaped gesture 3401 further limits the selection to the region 3304.

Figure 35:
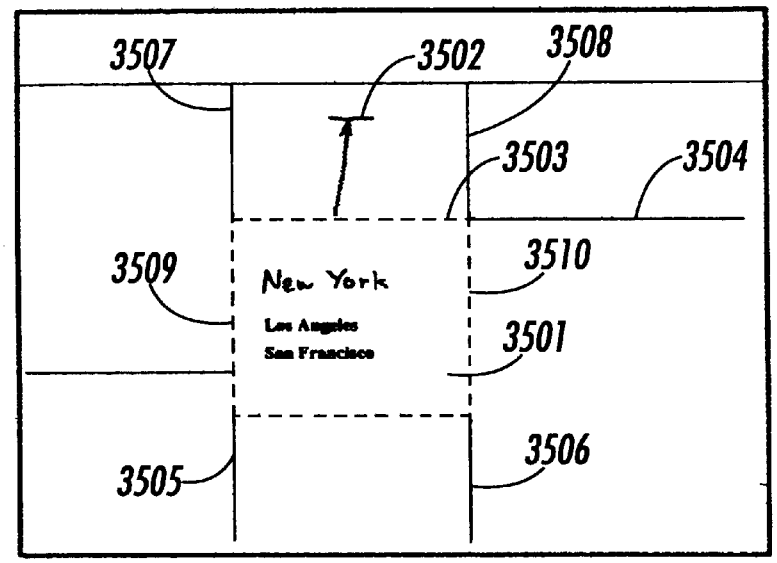
FIGS. 35–36 are an illustration of moving a structured region in a vertical direction as may be performed in the currently preferred embodiment of the present invention.
Figure 36:
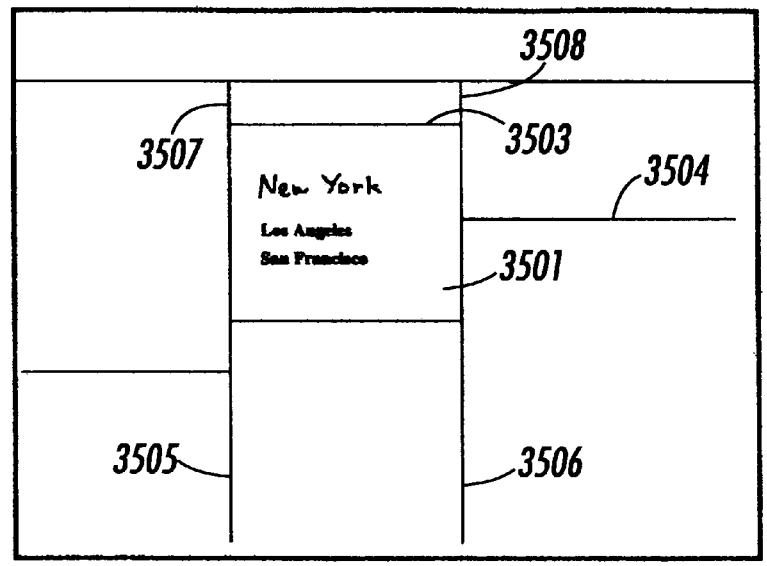

As with a selected border, a selected region may be moved by dragging. Movement is constrained to the horizontal and vertical directions. In the vertical direction this is illustrated in FIGS. 35–36. Referring to FIG. 35, a selected area 3501 is to be moved to a point 3502 (shown here for illustrative purposes). The result of the move is illustrated in FIG. 36. It should be noted that in FIG. 35, the horizontal border 3503 has a linear extension 3504. But as we see from FIG. 36, the linear extension 3504 does not move with the region 3501. However, as the vertical borders 3509 and 3510 are moved, their linear extensions are modified. Here, linear extension 3507 and 3508 are shortened while linear extensions 3505 and 3506 are stretched.

Figure 37:
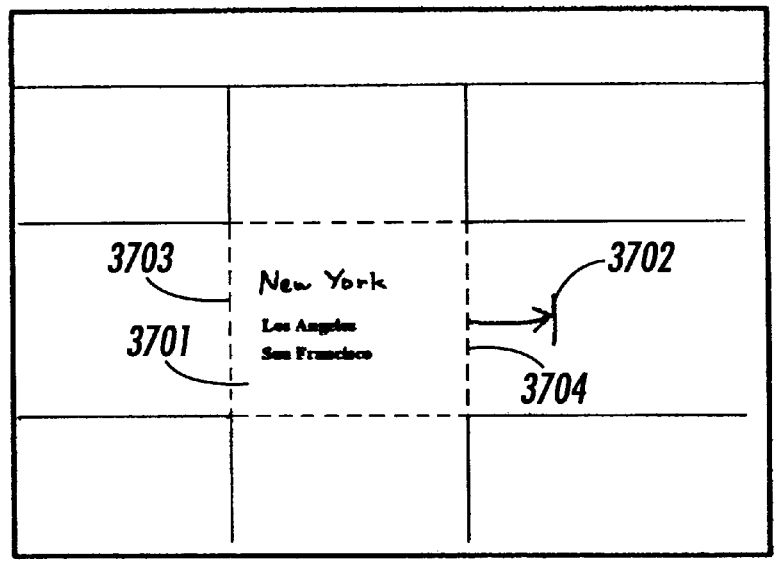
FIGS. 37–38 are an illustration of moving a structured region in a horizontal direction as may be performed in the currently preferred embodiment of the present invention.
Figure 38:
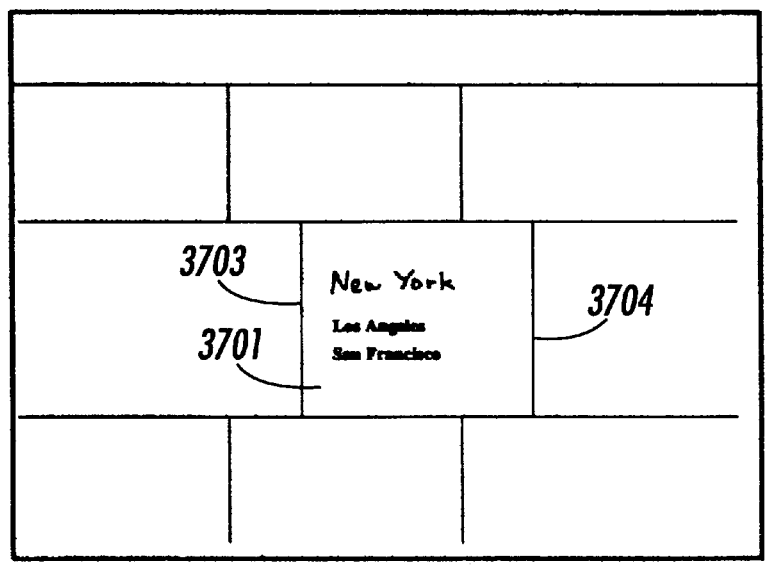

Movement of a region in the horizontal direction is illustrated in FIGS. 37–38. Referring to FIG. 37, the region 3701 is to be moved to point 3702 (shown here for illustrative purposes). The result of the move is illustrated in FIG. 37. As for the case of vertical movement, the linear extensions of the vertical borders 3703 and 3704 do not move and horizontal linear extensions are shortened or stretched accordingly.

Figure 39:
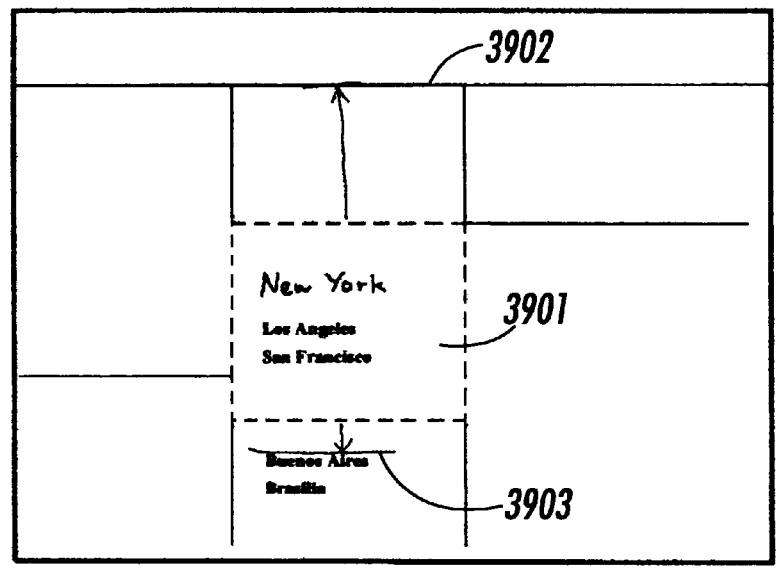
FIGS. 39–40 are an illustration of the limits of moving a structured region in the currently preferred embodiment of the present invention.
Figure 40:
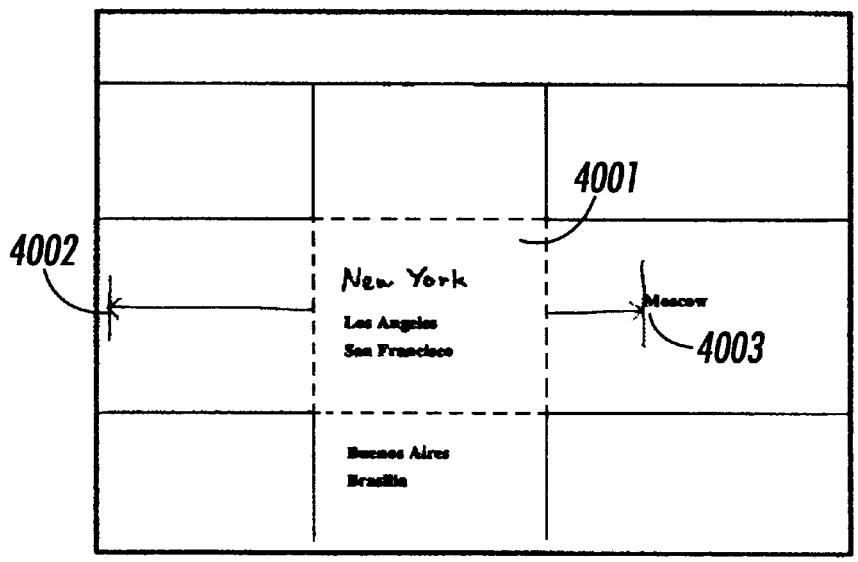

Movement of regions is also constrained by existing objects or borders. This is illustrated in FIGS. 39–40. Referring to FIG. 39, in the vertical direction the movement of region 3901 is constrained by the top horizontal border 3902 in the up direction and by the graphic object 3903 in the bottom direction. Referring to FIG. 40, in the horizontal direction, movement of the region 4001 is constrained to the left by left border 4002 and to the right by graphic object 4003.

Finally, a selected region may be deleted. The effect of deletion depends on the configuration of the tessellated work surface. Generally, if the selected 31 region is not part of a grid organization (e.g. a table or spreadsheet), then the graphic objects inside the region are also deleted and an amount of space equal to the space vacated by the deleted objects is contracted. In the currently preferred embodiment, such contraction is performed automatically and may cause various border locations to be shifted. If the selected region is part of a grid organization then the graphic objects in the region are deleted, but the selected region remains. This is done in order to avoid the ambiguity of which way to collapse the region (i.e. vertically or horizontally).

Automatic Region Expansion or Contraction

Operations on implicit structures such as lists will cause a structured bordered region to expand to the right or downward automatically when a structured list operation requires more room in the region. These operation are: a) moving/copying items into the region, b) scaling items in the region, c) display (or expand) list annotation/footnotes. These operation are illustrated in FIGS. 41–42, 43–44 and 45–46.

Figure 41:
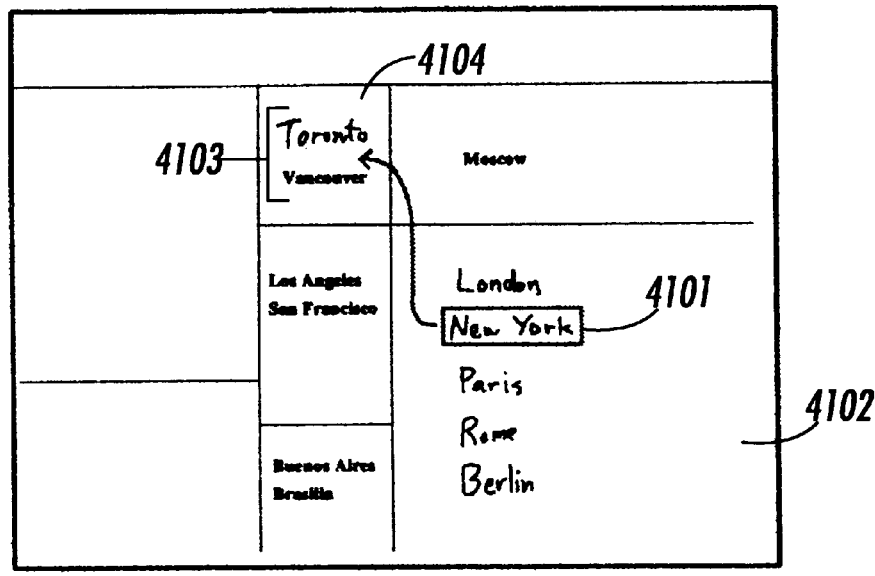
FIGS. 41–42 are an illustration of automatic region expansion when a list item is moved as may be performed in the currently preferred embodiment of the present invention.
Figure 42:
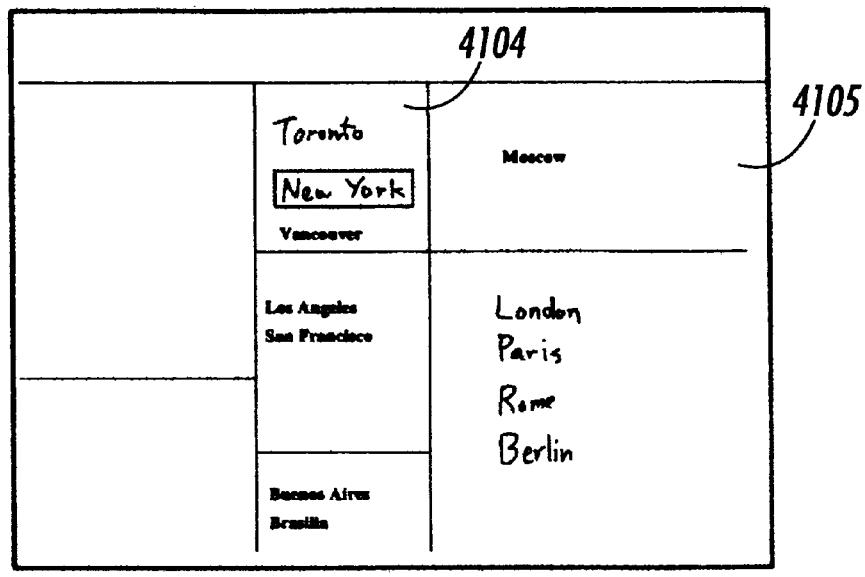

Referring to FIG. 41, list item 4101 in region 4102 is moved into list 4103 of region 4104. The result is illustrated in FIG. 42, wherein region 4104 has expanded both horizontally and vertically. It should be noted that a region 4105 has also expanded vertically as a result. This is because the expansion preserves the highest level border rectilinear tessellation structure; a structured border that needs to be pushed to the left or downward will carry with it the straight line extensions of that border. All objects in the regions to the right or below the moved borders will also be moved.

Figure 43:
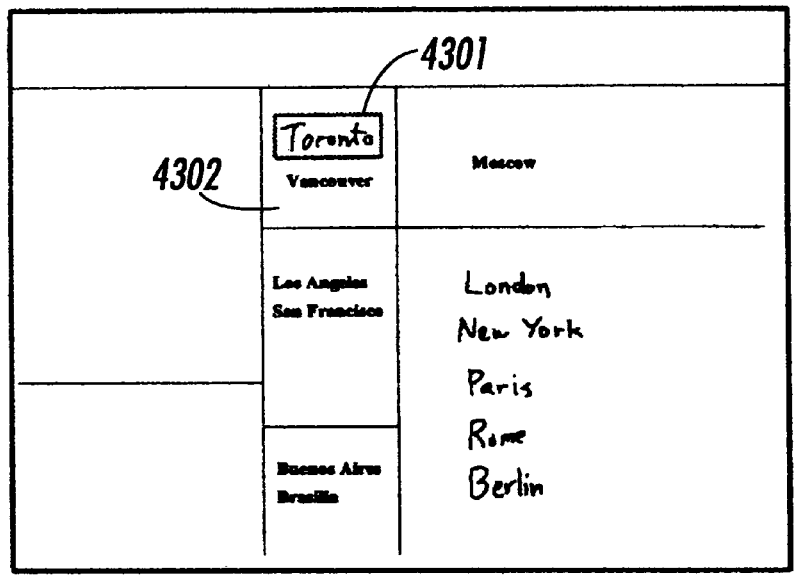
FIGS. 43–44 are an illustration of automatic region expansion when scaling as may be performed in the currently preferred embodiment of the present invention.
Figure 44:
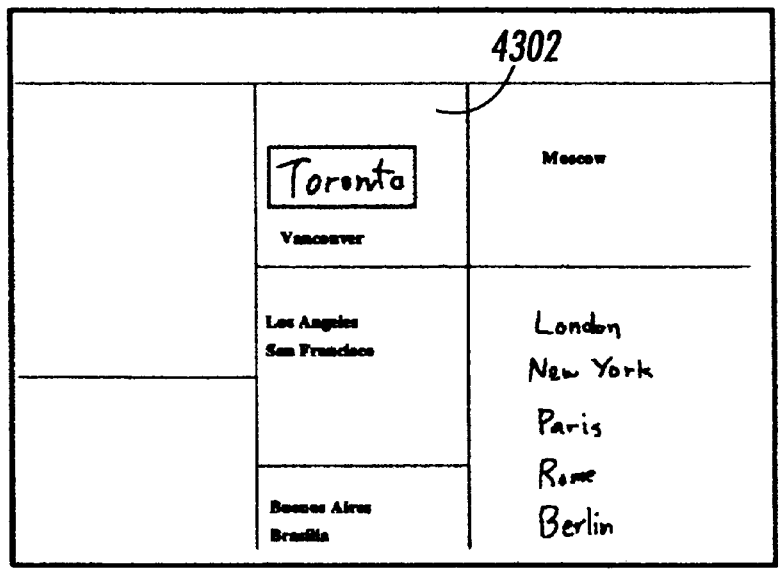

Referring to FIG. 43, list item 4301 in region 4302 is to be scaled to a larger size. The result is illustrated in FIG. 44 wherein the region 4302 has expanded to accommodate the expanded item.

Figure 45:
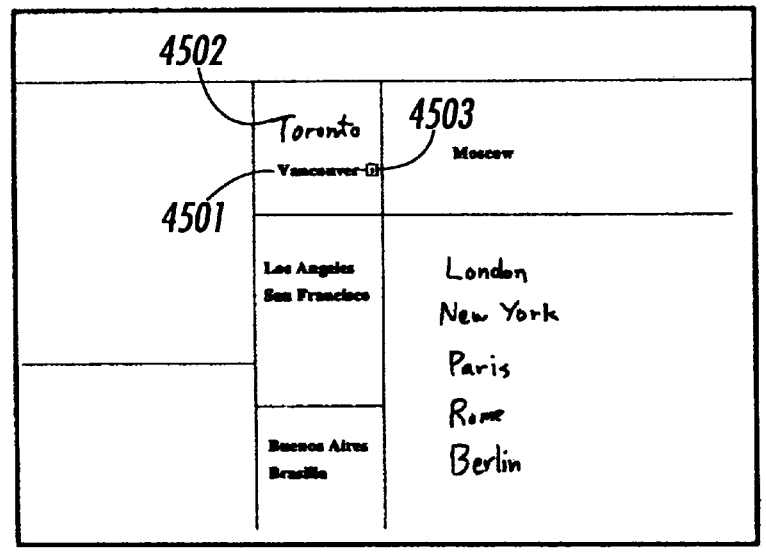
FIGS. 45–46 are an illustration of automatic region expansion when displaying the contents of a footnote as may be performed in the currently preferred embodiment of the present invention.
Figure 46:
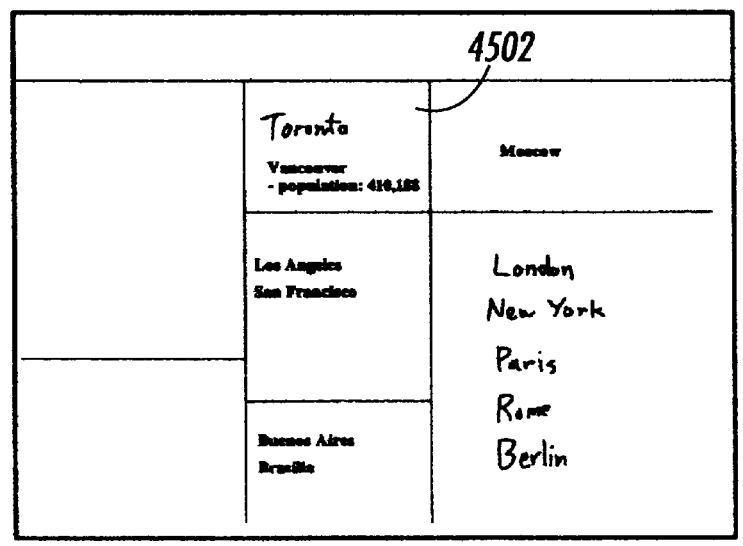

Referring to FIG. 45, list item 4501 in region 4502 has associated with it a footnote 4503. A display (or expand) operation is performed on the footnote 4503. The result is illustrated in FIG. 46, wherein the region 4502 expands in order to display the contents of the footnote.

In a similar fashion, regions are contracted when a list operation requires the removal of vacated space in a list. These operations are a) moving items out of a region, b) deleting an item, c) scaling down items, d) collapsing a list annotations/footnotes. As contraction is merely the inverse of expansion, further description of contraction is not deemed necessary.

Squeezing Regions

Figure 47:
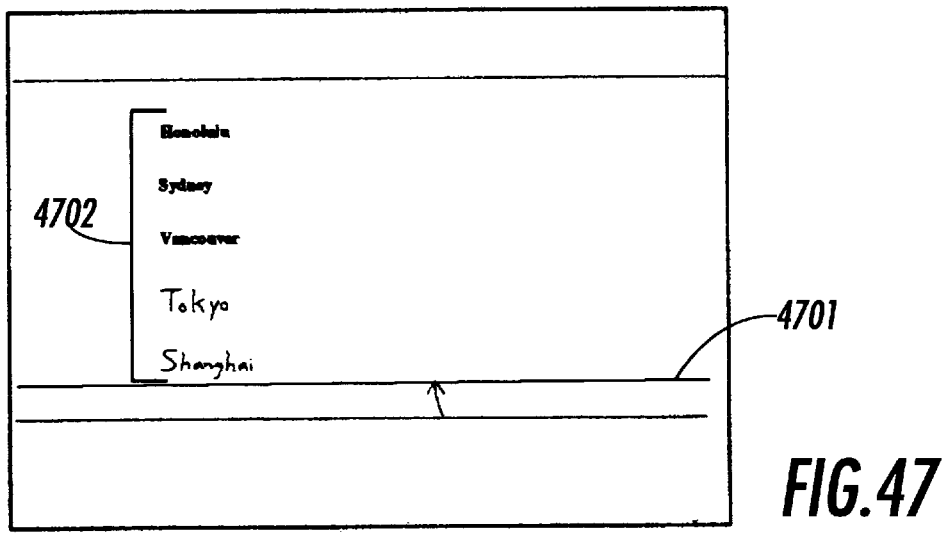
FIGS. 47–49 are an illustration of squeezing a region as may be performed in the currently preferred embodiment of the present invention.
Figure 48:
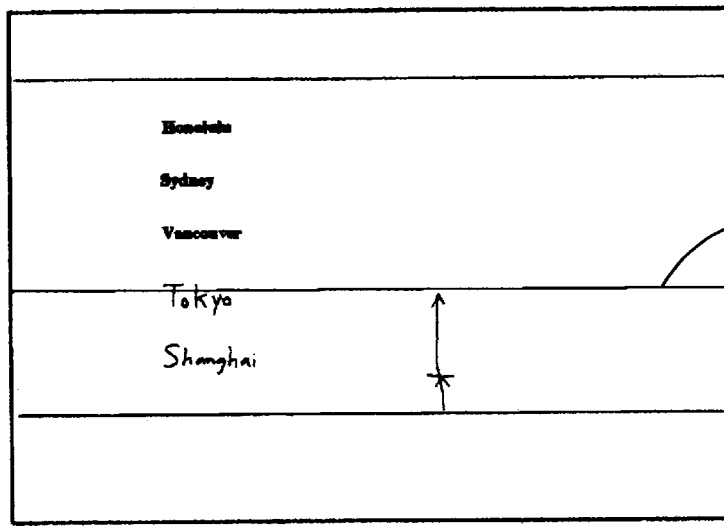
Figure 49:
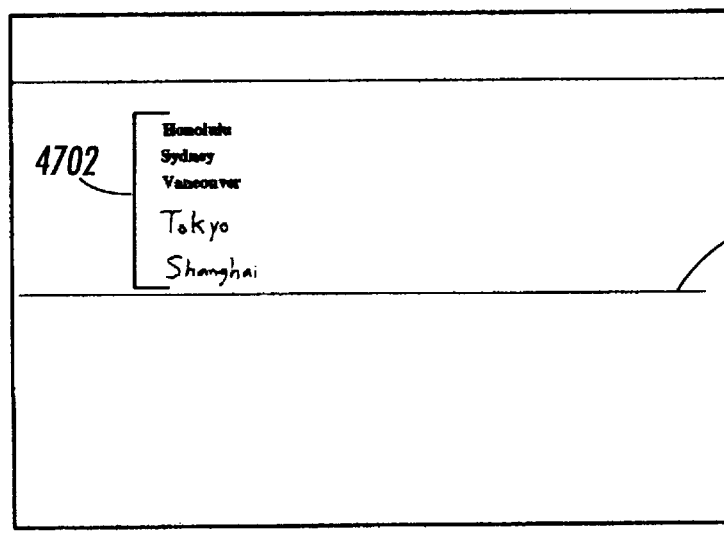

Ordinarily, a region can only be made as small as the outer limits of its contents. The border dragging operations stop there, as if stopped by a physical object. However, the user might want to further reduce the size of a region by taking out excess internal space (or by reformatting a narrow one-column list into a multiple-column flow region as described above). This is termed "squeezing" the region. When the user selects a border (with or without its extensions) and drags it upward, the user will receive some feedback ("resistance" to the dragging and visual change in the appearance of the border) at the point where the border hits an obstructing object. At this point the user can continue dragging the border further upward. When the user releases the drag, the space between the list items will be uniformly reduced so that the items fit in the now shorter region. This is illustrated in FIGS. 47–49. Referring to FIG. 47, border 4701 has been selected and is being dragged upward to squeeze the list 4702. In FIG. 47, the border 4701 has been moved to a position immediately below the bottom of list 4702. Referring to FIG. 48, the border 4701 has been moved to a position above the bottom of list 4702. Finally, referring to FIG. 49, the region is squeezed so that the entire list 4702 can be displayed.

There is, of course, a limit to how far the border can be dragged; this limit is pre-computed and is based on the collective height of the list items. However, as described above, the border can be further dragged and a flow region created.

It should also be noted that the currently preferred embodiment provides gestures for manually adding unused space (a wedge gesture) or to delete unused space (a pigtail gesture). Each instance adds/removes a line from the corresponding region of a predetermined size.

Structure Operation

Figure 50:
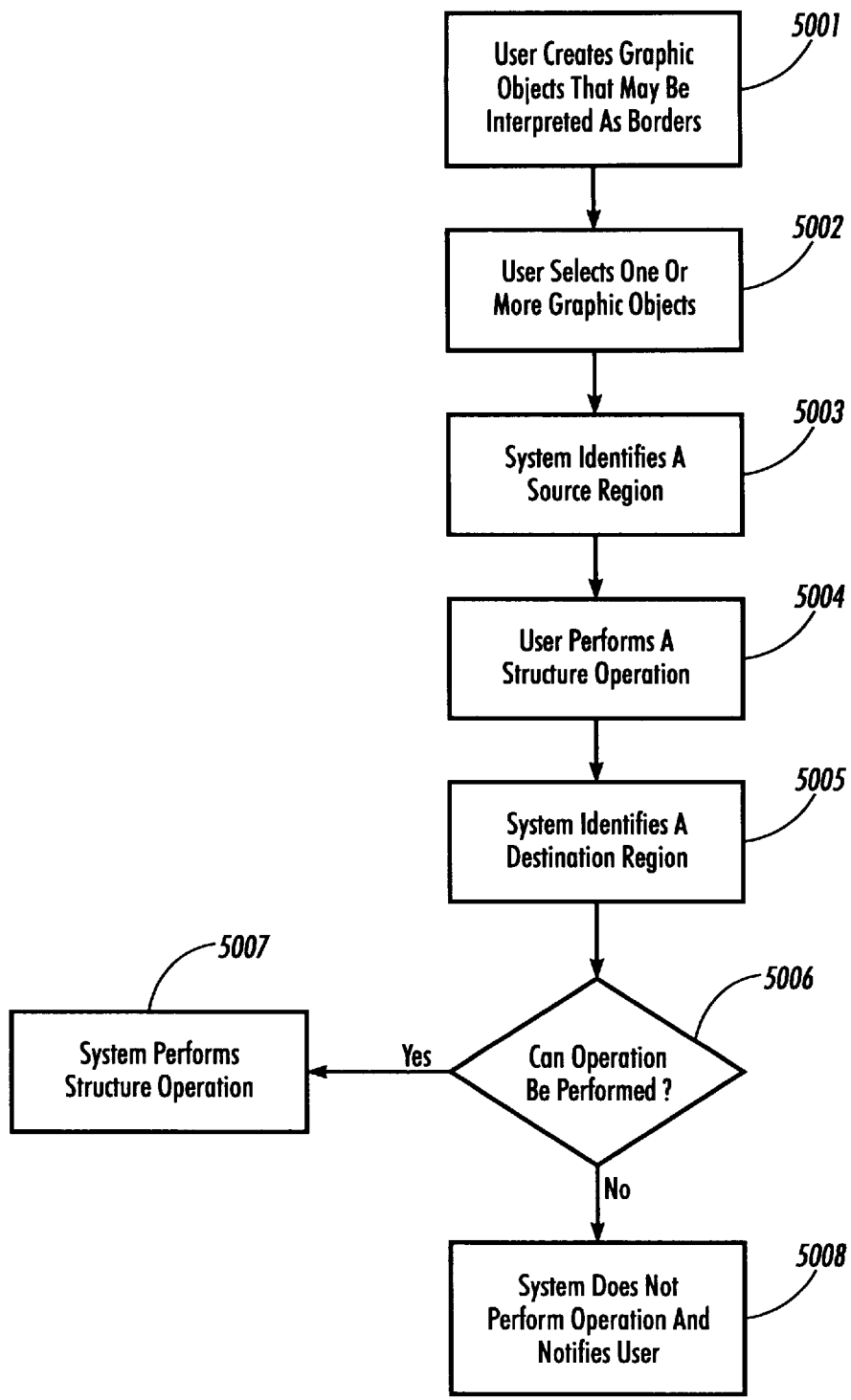
FIG. 50 is a flowchart illustrating the basic steps for determining whether a structure operation may be performed in the currently preferred embodiment of the present invention.

In the currently preferred embodiment, structure operations are the editing operations which take advantage of the tessellated work surface. During the performance of structure operations structured borders may move. This was described above with respect to automatic region expansion and contraction. The flow diagram of FIG. 50 illustrates the basic for analyzing a structure operation in the currently preferred embodiment of the present invention to see if it can be performed. Referring to FIG. 50, during the course of using an electronic whiteboard, a user creates one or more graphic objects that may be interpreted as structured borders, step 5001. Later, at some point in the interaction with the electronic whiteboard, the user makes a selection of one or more graphic objects, step 5002. The selection is typically a precursor to performing a structure operation. Recall that a structure operation is an operation that effects a group of graphic objects having an inherent relationship. The structure operation is 1) an operation that would be "natural" for the structure, and 2) preserves the inherent relationship of the structure. For example, an operation may be to insert or remove an item into a list. As expected when the item is inserted, items below the place of insertion may "move down".

When the selection occurs, the system identifies a "source" region, step 5003. The source region is identified for bookkeeping purposes. Once the selection occurs, some structure operation is performed, step 5004. For example, inserting an item into a list. Before the operation is performed, the system identifies the "destination" region, step 5005. Based, on the destination region the system determines from the standpoint of space, whether or not the operation can be performed, step 5006. As described above, a structure operation may cause regions expansion. Region expansion may be limited by the presence of anchor borders or other graphic objects. So there may be a finite amount of space available for expansion. In any event, the system checks for the presence of such constraints and makes an estimate of whether or not there is enough room for the structure operation to be performed.

If the system determines that space exists, the structure operation is performed, step 5007. As noted above, this may cause region expansion (e.g. move items into a list in a region) or possibly contraction (e.g. items moved from a list in a region). If the system determines that space does not exist, the structure operation is not performed and an indication returned to the user as to why the operation cannot be performed, step 5008.

Thus, a graphics based computer system providing for rectilinear tessellation of work space containing graphic objects is disclosed. While the present invention is described with respect to a preferred embodiment, it would be apparent to one skilled in the art to practice the present invention in alternative embodiments supporting gesture based input. Such alternate embodiments would not cause departure from the spirit and scope of the present invention.

We claim:

1. A method for operating a computer controlled display system so that the work surface can be organized into distinct regions to localize the effects of editing operations, said method comprising the steps of:
   a) a user generating one or more structured borders on said work surface causing said work surface to be tessellated into a plurality of regions;
   b) said user selecting one or more graphic objects on said work surface;
   c) said system identifying a source region associated with said selected one or more graphic objects;
   d) said user indicating a editing operation to be performed on said selected one or more graphic objects;
   e) said system identifying a destination region for performing said editing operation;
   f) said system determining spatial effects of said editing operation on said source region, said destination region and said tessellated work surface;
   g) said system determining if said editing operation can be carried out based on said spatial effects; and
   h) if said editing operation can be carried out, performing said editing operation.

2. The method as recited in claim 1 wherein said step of a user generating one or more structured borders on said work surface causing said work surface to be tessellated into a plurality of regions is further comprised of the steps of:
   a1) said user performing one or more border creation operations to cause one or more borders to be created on said work surface; and
   a2) concurrent with step a1), said system adjusting the position of graphic objects on said work surface in response to said one or more border creation operations.

3. The method as recited in claim 2 wherein said step of a user generating one or more structured borders on said work surface causing said work surface to be tessellated into a plurality of regions is further comprised of the steps of:

a3) said user initiating one or more border modification operations; and
   a4) said system performing a border modification operation so that it does not disrupt the rectilinear tessellation of said work surface.

4. The method as recited in claim 3 wherein said step of said user initiating one or more border modification operations is further comprised of the steps of:
   a5) said user selecting a border; and
   a6) said system highlighting said selected border and any dependent borders, said dependent borders being borders that would have to be modified if said selected border is modified in order to maintain rectilinear tessellation of said work surface.

5. The method as recited in claim 3 further comprising the step of said system performing a border modification operation so that it does not disrupt the rectilinear tessellation of said work surface is further comprised of the step of said system performing said border modification only if it does not cross an existing graphical object or other border.

6. The method as recited in claim 1 wherein said step of said system determining spatial effects of said editing operation on said destination region and said tessellated work surface is further comprised of the steps of said system determining a distance said editing operation would require said source and destination regions to expand or contract.

7. The method as recited in claim 6 wherein said step of said system determining if said editing operation can be carried out based on said spatial effects is further comprised of the step of said system determining if any existing borders or regions would prohibit said destination region from expanding said distance.

8. The method as recited in claim 7 said destination includes a list structure and said editing operation is an operation to insert a new graphic object into said list structure.

9. The method as recited in claim 7 wherein said structured borders include standard borders which may be modified by region expansion and anchor borders which may not expand and said step of said system determining if any existing borders or regions would prohibit said destination region from expanding said distance is comprised of the step of identifying an anchor border that would prevent such expansion.

10. In a computer controlled display system, a method for organizing a workspace comprising the steps of:
    a) a user generating a plurality of structured borders, said plurality of structured borders resulting in a rectilinear tessellation of said work surface into a plurality of regions, each region defining a spatial scope for editing operations performed within said region;
    b) said user selecting one of said plurality of structured borders;
    c) said system highlighting said selected border and any other dependent borders, said dependent borders comprising borders which would have to be deleted if said selected border is deleted in order to maintain said rectilinear tessellation of said work surface;
    d) said user performing an operation on said selected border; and
    e) said system performing said operation on said selected border and corresponding operation on said dependent borders.

11. The method as recited in claim 10 wherein said operation is a delete operation and said corresponding operations on said dependent borders is to delete said dependent borders.

12. In a computer controlled display system, a method for organizing a workspace comprising the steps of:
   a) a user generating a plurality of structured borders, said plurality of structured borders resulting in a rectilinear tessellation of said work surface into a plurality of regions, each region defining a spatial scope for editing operations performed within said region;
   b) said user selecting one of said plurality of regions;
   c) said user performing an operation on said selected region; and
   d) said system performing corresponding operations on structured borders defining said selected region and the graphic objects contained within said selected region.

13. The method as recited in claim 12 wherein said operation on said selected region is a delete operation and said method further comprising the substep of determining if said selected region is part of a grid structure, and if it is not part of a grid structure said corresponding operations on structured borders defining said selected region and the graphic objects contained within said selected region are delete operations.

14. The method as recited in claim 13 wherein if said selected region is part of a grid structure, no corresponding operation is performed on said structured borders defining said selected regions and a delete operation is performed on the graphic objects contained within said selected region.

15. The method as recited in claim 12 wherein said operation on said selected region is a move operation and said corresponding operations on structured borders defining said selected region and the graphic objects contained within said selected region are move operations.

16. The method as recited in claim 15 further comprising the step of performing border modification operations on linear extensions of said structured borders defining said selected region.

17. A computer controlled display system for creating and displaying graphical objects, said computer controlled display system comprising:
   a display for showing a work surface,
   border creation means, said border creation means for creating borders on said work surface, said borders defining regions of said work surface;
   border editing means, said border editing means for editing an existing border while retaining a rectilinear tessellation of said work space with said borders;
   input means for inputting pen strokes on said work surface and initiating operations on graphic objects on said work surface; and
   operation processing means for processing operations on graphic objects on said work surface, said operation processing means further having means for isolating operations performed on graphic objects in a first region defined by a first set of borders from having an effect on graphic objects in a second region defined by a second set of borders.

18. The computer controlled display system as recited in claim 17 wherein said border editing means is further comprised of:
   means for selecting a border to be edited;
   means for identifying dependent borders of said selected border;
   means for deleting a selected borders and its dependent borders; and
   means for stretching and contracting a selected borders and its dependent borders.

19. The computer controlled display system as recited in claim 17 wherein said operation processing means is further comprised of means for adjusting borders responsive to an operation being performed.

20. The computer controlled display system as recited in claim 19 wherein said means for adjusting borders is further comprised of:
   means for determining spatial effects of said operation;
   means for determining if the position of any other border would prohibit performance of said operation because of said spatial effects; and
   means for adjusting said borders based on said spatial effects if the position of any other does not prohibit performance of said operation.

* * * * *